United States Patent
Pinheiro et al.

(10) Patent No.: US 10,404,542 B2
(45) Date of Patent: Sep. 3, 2019

(54) METHOD AND APPARATUS FOR SUPPORTING MACHINE-TO-MACHINE COMMUNICATIONS

(75) Inventors: Ana Lucia Pinheiro, Breinigsville, PA (US); Rocco DiGirolamo, Laval (CA); Paul L. Russell, Jr., Pennington, NJ (US); Jean-Louis Gauvreau, La Prairie (CA); Nicholas J. Podias, Brooklyn, NY (US); Michael F. Starsinic, Newtown, PA (US); Dale N. Seed, Allentown, PA (US); Chonggang Wang, Princeton, NJ (US); Guang Lu, Dollard-des-Ormeaux (CA)

(73) Assignee: IOT HOLDINGS, INC., Wilmington, DE (US)

( * ) Notice: Subject to any disclaimer, the term of this patent is extended or adjusted under 35 U.S.C. 154(b) by 528 days.

(21) Appl. No.: 13/583,496

(22) PCT Filed: Mar. 9, 2011

(86) PCT No.: PCT/US2011/027697
§ 371 (c)(1),
(2), (4) Date: Apr. 9, 2013

(87) PCT Pub. No.: WO2011/112683
PCT Pub. Date: Sep. 15, 2011

(65) Prior Publication Data
US 2013/0188515 A1 Jul. 25, 2013

Related U.S. Application Data

(60) Provisional application No. 61/311,971, filed on Mar. 9, 2010, provisional application No. 61/326,060, filed (Continued)

(51) Int. Cl.
*H04L 12/24* (2006.01)
*H04W 4/70* (2018.01)
(Continued)

(52) U.S. Cl.
CPC .............. *H04L 41/12* (2013.01); *H04L 67/12* (2013.01); *H04L 67/16* (2013.01); *H04W 4/50* (2018.02); *H04W 4/70* (2018.02); *Y02D 30/34* (2018.01)

(58) Field of Classification Search
CPC ......... H04L 41/12; H04L 67/16; H04L 67/12; H04W 4/001; H04W 4/005; Y02B 60/45
See application file for complete search history.

(56) References Cited

U.S. PATENT DOCUMENTS 7,752,634 B1 * 7/2010 Saxena et al. ................ 719/320
8,149,849 B2 4/2012 Osborn et al.
(Continued)

FOREIGN PATENT DOCUMENTS

CN 1882180 A 12/2006
EP 1516263 A1 3/2005
(Continued)

OTHER PUBLICATIONS

"Draft ETSI Machine-to-Machine communications (M2M); Functional architecture," TS 102 690 V0.1.3 (Feb. 2010).
(Continued)

*Primary Examiner* — Noel R Beharry
*Assistant Examiner* — Wilfred Thomas
(74) *Attorney, Agent, or Firm* — Volpe and Koenig, P.C.

(57) ABSTRACT

Method and apparatus for supporting machine-to-machine (M2M) communications in a hierarchical network architecture including an M2M gateway are disclosed. An M2M entity, (such as M2M device, M2M gateway, or M2M network entity), may perform a service capability discovery procedure to discover an M2M service capability entity that may provide an M2M service capability, and register with the discovered M2M service capability entity. The address or identity of the service capability entity may be pre-
(Continued)

configured or obtained from the dispatcher server. The M2M entity may indicate a support M2M service identifier and receive an identity or address of the M2M service capability entity mapping the service identifier. The gateway may advertise M2M service identifiers supported by the gateway so that the M2M device may access the gateway if there is a match. The address of M2M service capability entities may be obtained from the core network.

20 Claims, 29 Drawing Sheets

Related U.S. Application Data on Apr. 20, 2010, provisional application No. 61/415,633, filed on Nov. 19, 2010.

(51) Int. Cl.
  *H04W 4/50* (2018.01)
  *H04L 29/08* (2006.01)

(56) References Cited

U.S. PATENT DOCUMENTS

| | | | |
|---|---|---|---|
| 8,170,481 B2 | 5/2012 | Rangarajan et al. | |
| 8,295,158 B2 | 10/2012 | Li et al. | |
| 2003/0037113 A1* | 2/2003 | Petrovykh | 709/205 |
| 2003/0231647 A1* | 12/2003 | Petrovykh | 370/429 |
| 2005/0083854 A1* | 4/2005 | Nagarajrao et al. | 370/254 |
| 2006/0229090 A1* | 10/2006 | LaDue | 455/507 |
| 2007/0050376 A1* | 3/2007 | Maida-Smith et al. | 707/10 |
| 2008/0064395 A1* | 3/2008 | Sibileau | G08C 17/02 455/433 |
| 2008/0137823 A1* | 6/2008 | Abichandani et al. | 379/106.01 |
| 2008/0153521 A1* | 6/2008 | Benaouda | G01D 4/004 455/466 |
| 2009/0059919 A1 | 3/2009 | Kim et al. | |
| 2009/0116467 A1 | 5/2009 | Shi et al. | |
| 2009/0217348 A1* | 8/2009 | Salmela | H04L 63/08 726/2 |
| 2010/0057485 A1* | 3/2010 | Luft | H04W 4/70 455/411 |
| 2010/0122334 A1* | 5/2010 | Stanzione et al. | 726/11 |
| 2010/0306350 A1* | 12/2010 | Salmela et al. | 709/220 |
| 2011/0016321 A1* | 1/2011 | Sundaram | H04L 63/061 713/171 |
| 2011/0032896 A1 | 2/2011 | Cubic et al. | |
| 2011/0154022 A1* | 6/2011 | Cheng | H04L 63/062 713/154 |
| 2011/0213871 A1 | 9/2011 | DiGirolamo et al. | |
| 2012/0004003 A1* | 1/2012 | Shaheen et al. | 455/509 |
| 2012/0047551 A1* | 2/2012 | Pattar | H04W 4/00 726/1 |
| 2012/0281658 A1* | 11/2012 | Rikkinen | H04W 88/04 370/329 |
| 2012/0302229 A1* | 11/2012 | Ronneke | H04L 29/12754 455/422.1 |
| 2013/0013793 A1* | 1/2013 | Sanchez Herrero | H04W 4/70 709/227 |

FOREIGN PATENT DOCUMENTS

| | | |
|---|---|---|
| JP | 2005328170 A2 | 11/2005 |
| JP | 2009-544200 A | 12/2009 |
| JP | 2011-523807 A | 8/2011 |
| WO | 08/135094 | 11/2008 |
| WO | 2008/135094 A1 | 11/2008 |
| WO | WO 2009/138119 A1 | 11/2009 |
| WO | WO 2009/149759 A1 | 12/2009 |
| WO | WO 2011/082150 A1 | 7/2011 |

OTHER PUBLICATIONS

Third Generation Partnership Project, "Technical Specification Group Services and System Aspects; Feasibility Study on the Security Aspects of Remote Provisioning and Change of Subscription for M2M Equipment; (Release 9)," 3GPP TR 33.812 V9.0.0 (Dec. 2009).

Third Generation Partnership Project, "Technical Specification Group Services and System Aspects; Feasibility Study on the Remote Management of USIM Application on M2M Equipment; (Release 8)," 3GPP TR 33.812 V1.0.0 (Sep. 2008).

Third Generation Partnership Project, "Technical Specification Group Services and System Aspects; Feasibility Study on the Security Aspects of Remote Provisioning and Change of Subscription for M2M Equipment; (Release 9)," 3GPP TR 33.812 V2.1.0 (Dec. 2009).

Third Generation Partnership Project, "Technical Specification Group Services and System Aspects; Feasibility study on the security aspects of remote provisioning and change of subscription for Machine to Machine (M2M) Equipment (Release 9)," 3GPP TR 33.812 V9.0.0 (Jun. 2010).

Machine to Machine Communications (M2M); Functional Architecture, Draft ETSI TS 102 690, V<0.1.3>, 650 Route des Lucioles, F-06921 Sophia Antipolis Cedex, France, Feb. 23, 2010.

3rd Generation Partnership Project (3GPP); Technical Specification Group Services and System Aspects; Feasibility Study on the Security Aspects of Remote Provisioning and Change of Subscription for M2M Equipment; (Release 9); 3GPP TR 33.812; V2.1.0; 650 Route des Lucioles, F-06921 Sophia Antipolis Cedex, France, Dec. 20, 2009.

Interdigital, "M2M Prototype Demonstration", ETSI M2M #12, Philadelphia, PA, Sep. 16, 2010, pp. 2-24.

3rd Generation Partnership Project (3GPP), S2-101254, "Consideration on Gateway Type of MTC Devices", ETRI, 3GPP TSG SA WG2 Meeting #78, San Francisco, USA, Feb. 22-26, 2010, 3 pages.

* cited by examiner

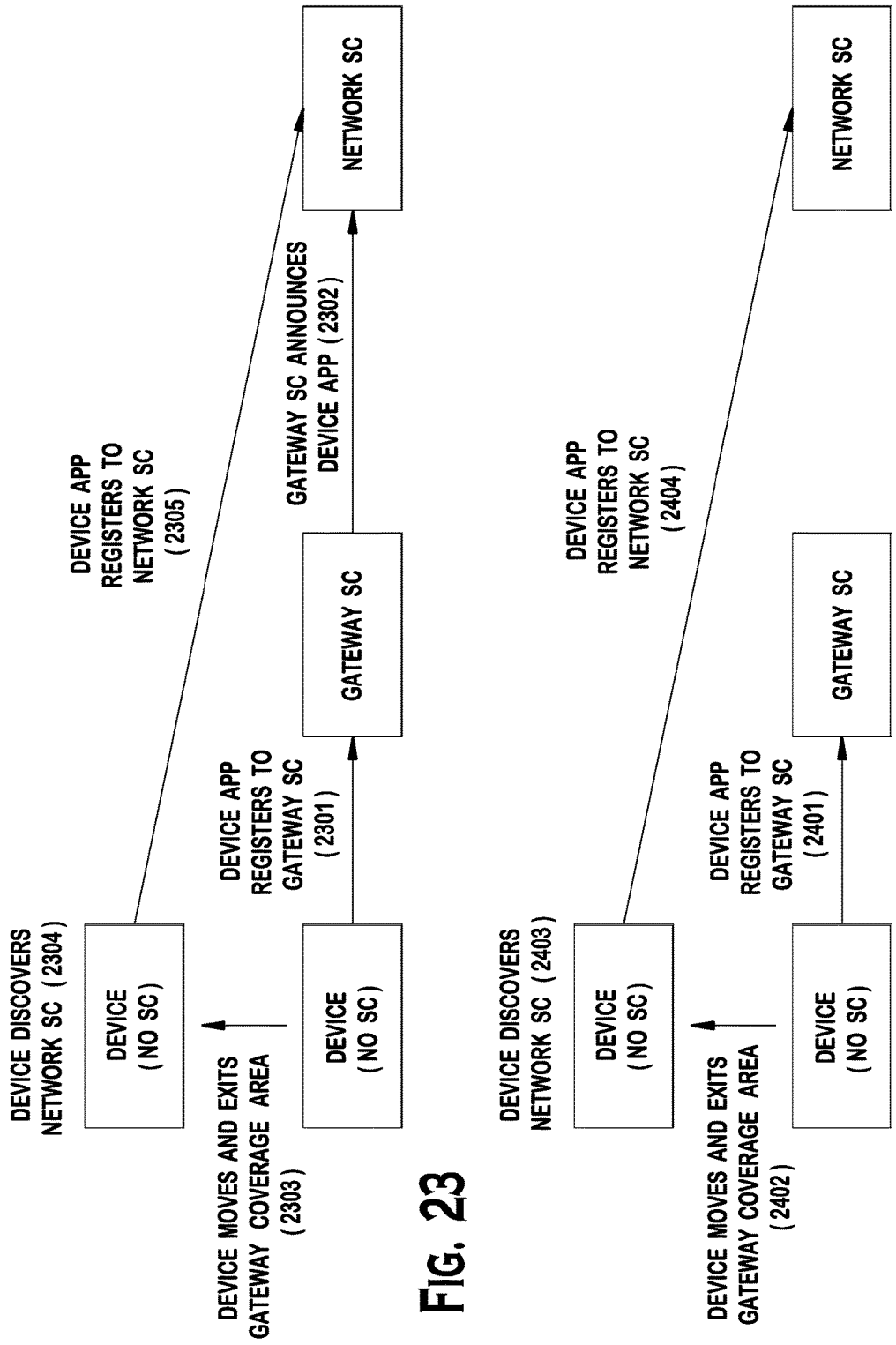

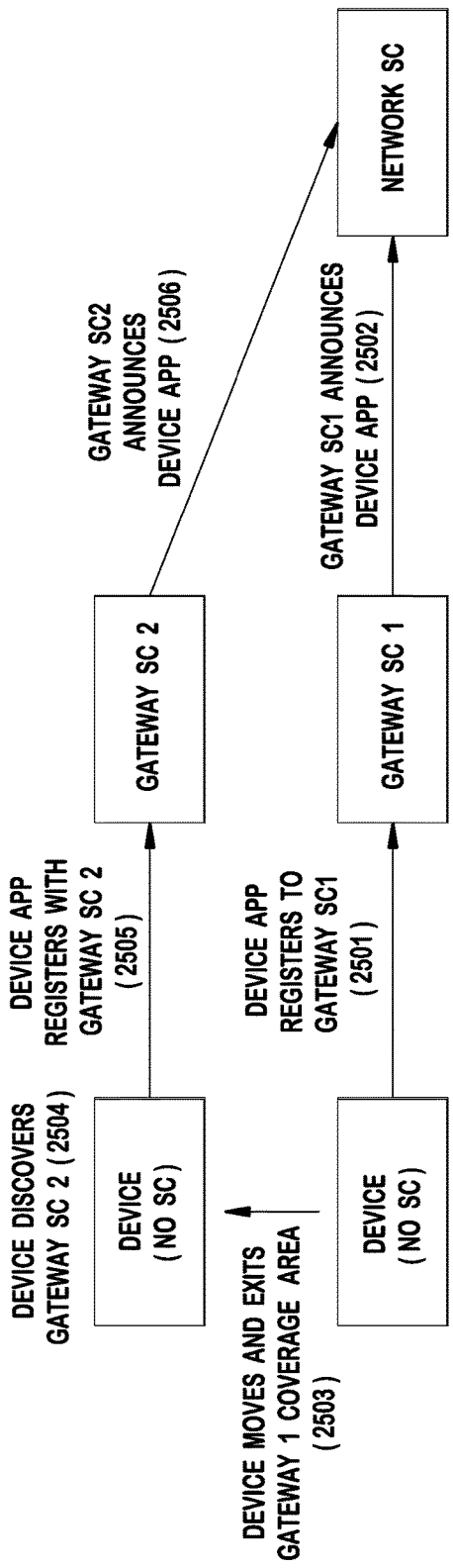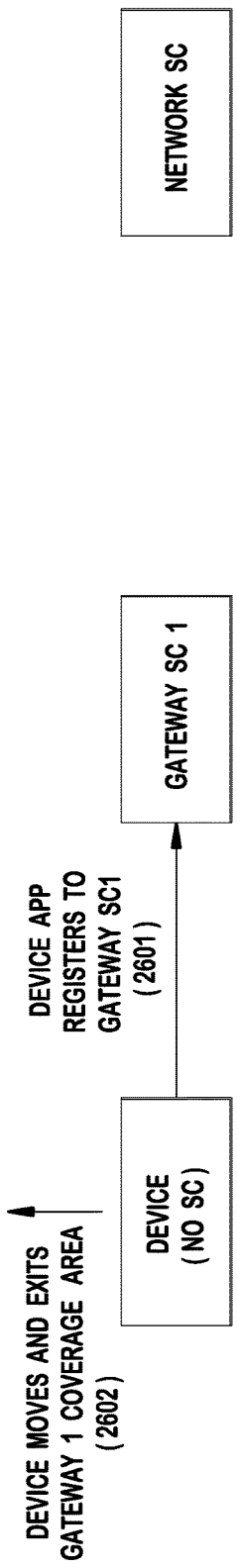
FIG. 25
FIG. 26

METHOD AND APPARATUS FOR SUPPORTING MACHINE-TO-MACHINE COMMUNICATIONS

CROSS REFERENCE TO RELATED APPLICATIONS

This application claims priority to International Application No. PCT/US2011/027697, filed Mar. 9, 2011, which claims the benefit of U.S. Provisional Application No. 61/311,971, filed Mar. 9, 2010; U.S. Provisional Application No. 61/326,060, filed Apr. 20, 2010; and U.S. Provisional Application No. 61/415,633, filed Nov. 19, 2010, which are incorporated by reference as if fully set forth.

BACKGROUND

A machine-to-machine (M2M) communication is a communication between a group of devices capable of autonomously transmitting and receiving data without human intervention. The M2M communication system includes devices, (such as a sensor or meter), to capture information, (such as temperature, etc.), and relay over a wireless or wired network. With a wide variety of potential applications, the number of M2M enabled devices is increasing.

European Telecommunications Standards Institute (ETSI) is currently attempting to describe end-to-end system requirements to support M2M communication services. As part of this effort, ETSI is describing the M2M functional architecture to deliver M2M services to applications. The main goal of the M2M functional architecture is to present the overall end-to-end M2M functional entities, the relationships between these entities, as well as relationship to ETSI Telecommunications and Internet converged Services and Protocols for Advanced Networking (TISPAN) and third generation partnership project (3GPP) networks.

SUMMARY

Embodiments for supporting M2M communications in a hierarchical network architecture including an M2M gateway are disclosed. An M2M entity, (such as M2M device, M2M gateway, or M2M network entity), may perform a service capability discovery procedure to discover an M2M service capability entity that may provide an M2M service capability, and register with the discovered M2M service capability entity. The address or identity of the service capability entity may be pre-configured or obtained from the dispatcher server. The M2M entity may indicate a support M2M service identifier and receive an identity or address of the M2M service capability entity mapping the service identifier. The gateway may advertise M2M service identifiers supported by the gateway so that the M2M device may access the gateway if there is a match. The address of M2M service capability entities may be obtained from the core network. The M2M device may perform a hierarchy discovery so that service capabilities may be optimally distributed.

The gateway may include peer service capabilities of the service capabilities in the core network. The M2M gateway may include at least one of functionalities related to discovery of service capability across a hierarchical architecture, configuration of service capability across a hierarchical architecture, generic M2M device application enablement (GMDAE), reachability, addressing and device application repository (RADAR), network and communication service selection (NCSS), history and data retention (HDR), security capability (SC), generic M2M network application enablement (GMAE), M2M device and M2M gateway management (MDGM), compensation brokerage (CB) capability, M2M device and M2M gateway proxy (MDGP), or location service.

BRIEF DESCRIPTION OF THE DRAWINGS

A more detailed understanding may be had from the following description, given by way of example in conjunction with the accompanying drawings wherein:

FIG. 23 is an example signaling flow for service capability transfer when an M2M device having no service capability leaves the gateway coverage in case of full visibility;

FIG. 24 is an example signaling flow for service capability transfer when an M2M device having no service capability leaves the gateway coverage in case of no visibility;

FIG. 25 is an example signaling flow for service capability transfer when an M2M device having no service capability enters a new gateway coverage in case of full visibility; and FIG. 26 is an example signaling flow for service capability transfer when an M2M device having no service capability enters a new gateway coverage in case of no visibility.

DETAILED DESCRIPTION

Figure 1A:
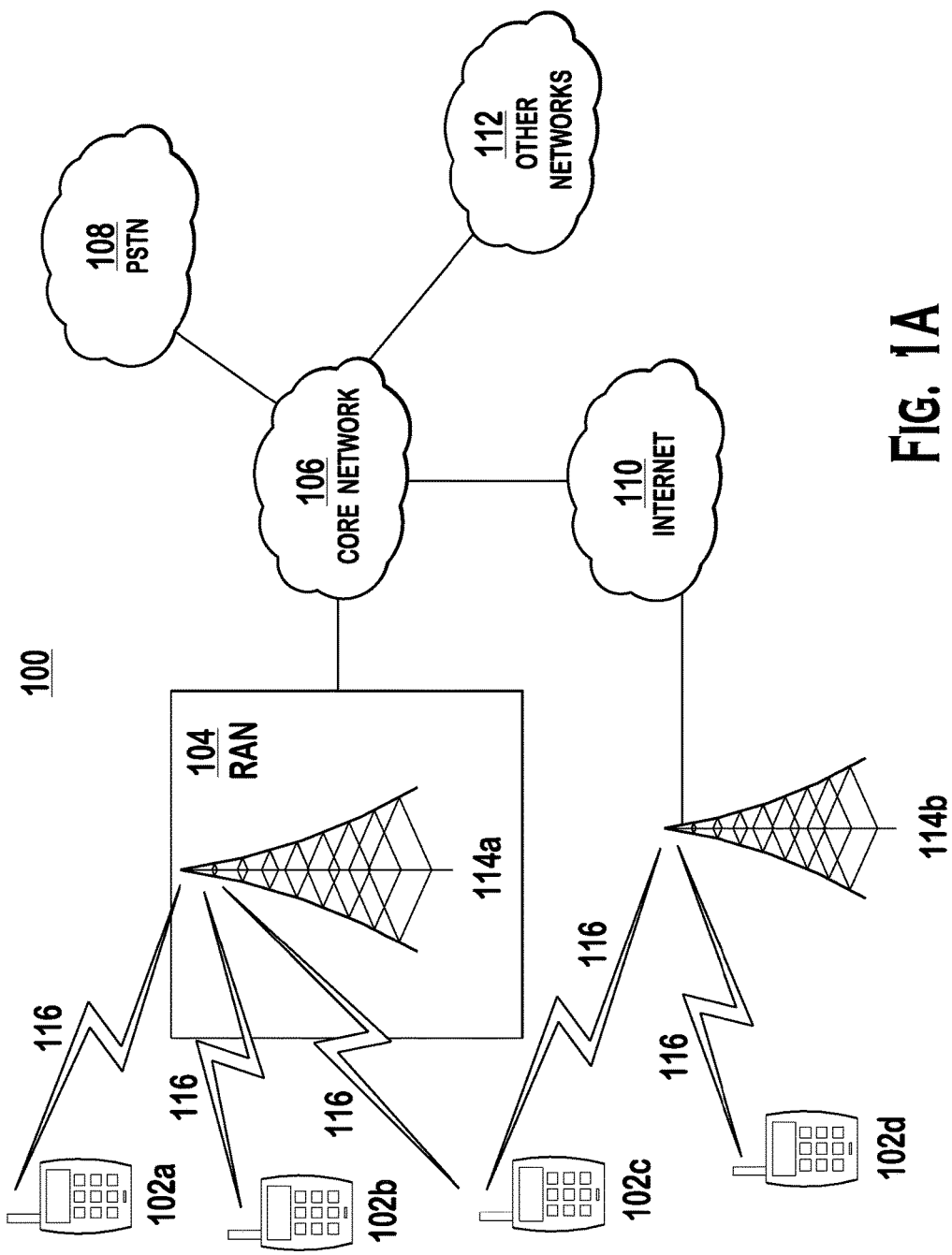
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
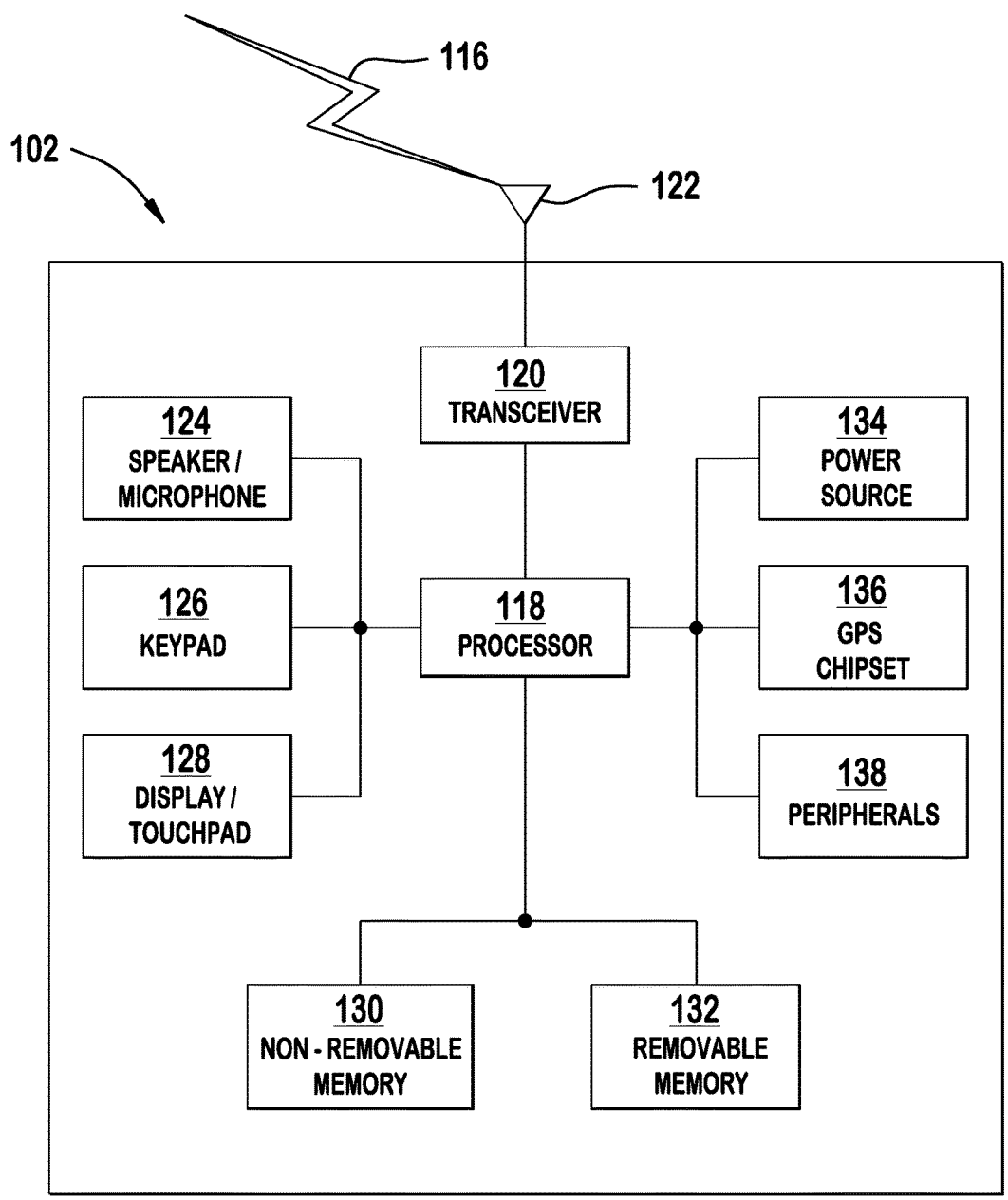
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
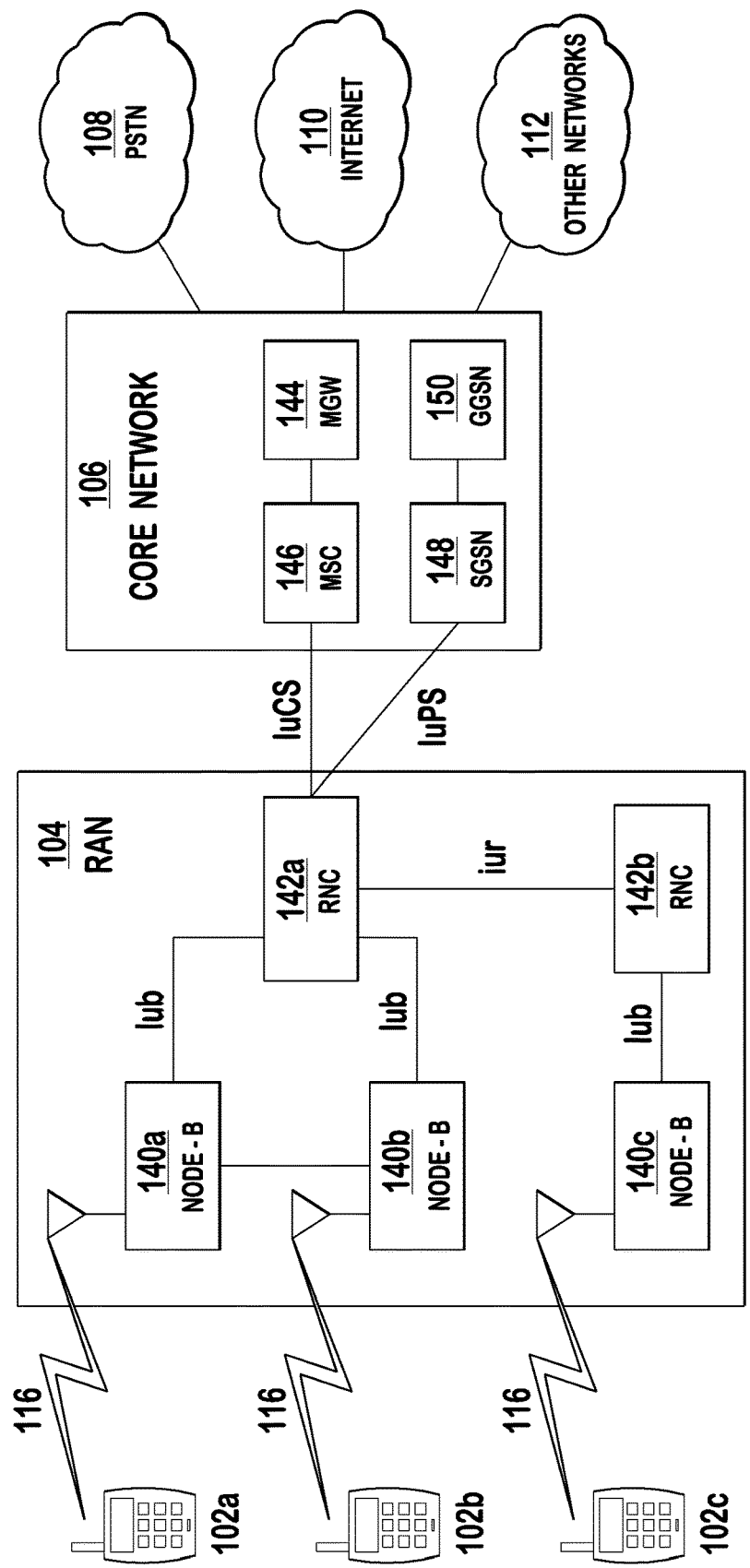
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

It should be noted that the embodiments disclosed herein may be implemented in any type of wireless communication systems including, but not limited to, WCDMA, LTE, LTE-Advanced, cdma2000, WiMAX, and the like. It should be noted that the embodiments disclosed herein may be implemented alone or in any combination.

Figure 2:
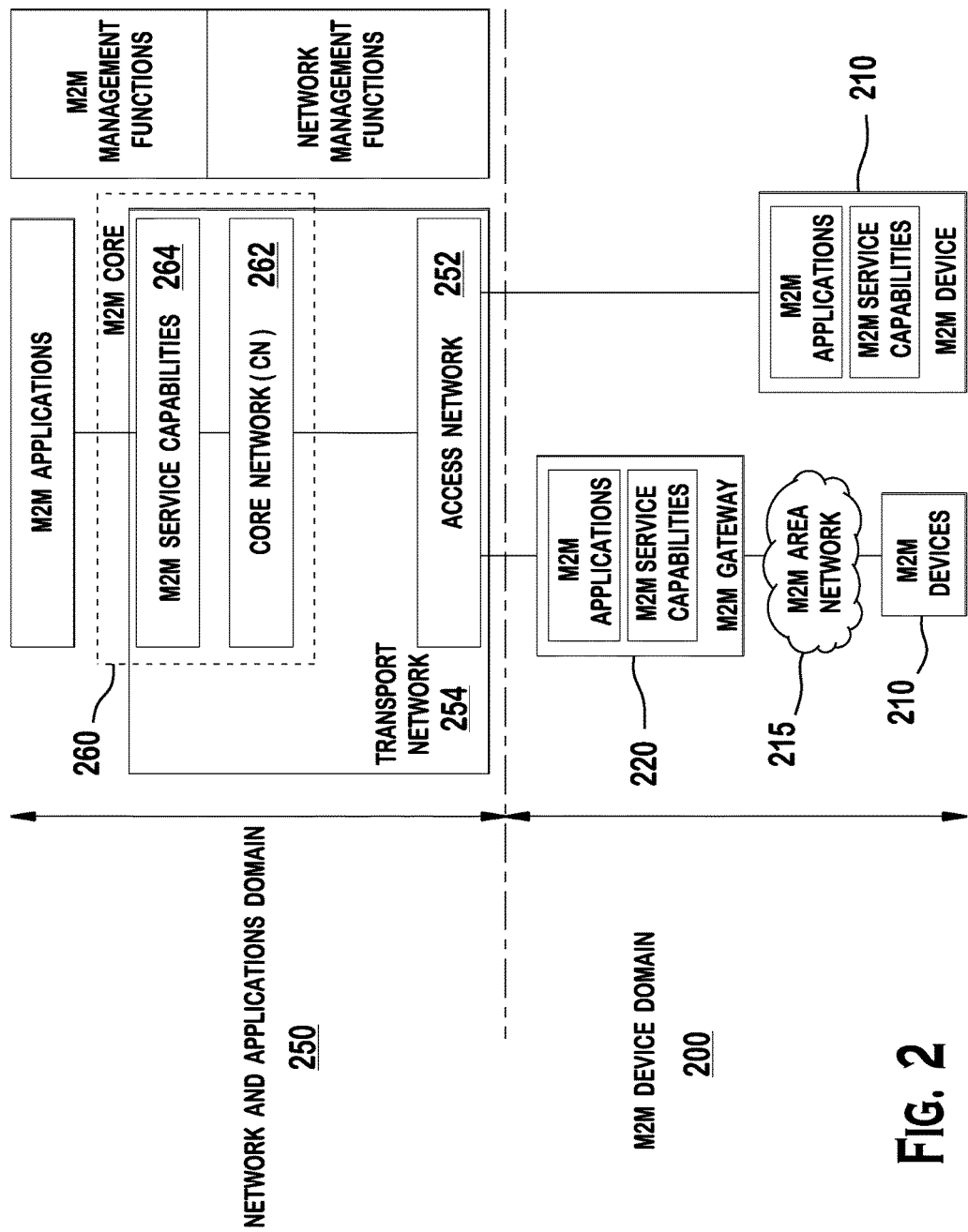
FIG. 2 shows an example overall M2M functional architecture.

FIG. 2 shows an example overall M2M functional architecture. The M2M system includes an M2M device domain 200 and a network and applications domain 250. The M2M device domain 200 comprises M2M device(s) 212, M2M area network(s) 215, and M2M gateway(s) (GWs) 220. The M2M area network 215 is a network of devices for M2M communications, (e.g., ZigBee, 6lowPAN, etc.). The M2M area network 215 may be referred to as a capillary network. A local network, such as a local area network (LAN) or personal area network (PAN), etc., may form the M2M area network. An M2M device 210 runs M2M application(s) using M2M service capabilities and network domain functions. M2M devices 210 may connect to the M2M core either directly or via the M2M gateway 220. The M2M area network 215 provides connectivity between M2M devices 210 and the M2M gateway 220.

The network and application domain 250 comprises an access network 252, a transport network 254, and an M2M core 260. The access network 252 refers to part of the network and application domain which provides the M2M devices 210 and gateways 220 to connect to the M2M core service capabilities. The access network 252 allows the M2M device domain to communicate with the core network 262. Examples of the access networks 252 include x-digital subscriber line (xDSL), GPRS EDGE radio access network (GERAN), UMTS terrestrial radio access network (UTRAN), evolved UTRAN, wireless local area network (WLAN), WiMAX, or the like. The transport network 254 allows transport of data within the network and application domain 250. The M2M core 260 comprises a core network 262 and M2M service capabilities 264. The core network 262 provides IP connectivity, or the like. The service capabilities 264 provide M2M functions that are to be shared by different applications.

M2M applications run the service logic and use M2M service capabilities accessible via an open interface. The M2M applications may be server-based applications or client-based applications. The server-based applications refer to applications that locally communicate with and/or control the M2M devices in the locally connected M2M area network(s). The client-based applications refer to applications that respond to network application requests coming from the M2M core network.

The M2M system has M2M management functions that comprise the functions required to manage the access network 252, transport network 254, and core network 262, such as provisioning, supervision, fault management, etc. The M2M management functions comprise the functions required to manage generic functionalities of M2M applications and M2M service capabilities in the network and application domain 250. The management of the M2M devices 210 and gateways 220 may use M2M service capabilities.

The core network 262, the access network 252, the M2M gateway 220, and the M2M devices 210 have M2M service capabilities. The M2M service capabilities (or "service capabilities") is a grouping of functions that enable end-to-end communication between applications. Service capabilities provide functions that are to be shared by different applications. Service capabilities may use core network functionalities through a set of exposed interfaces, (e.g., conventional interfaces specified by 3GPP, 3GPP2, ETSI TISPAN, etc.). Service capabilities may invoke other service capabilities. Service capabilities may interface to one or several core networks.

The M2M gateway 220 provides a connection between the M2M area network(s) 215 and the M2M network application and/or service capabilities. The M2M gateway 220 has access to the M2M core network 262 via the M2M access network 252 and to the M2M network coordinator(s) or device(s) of the M2M area network(s) 215. The M2M network coordinator refers to an entity in the M2M area network 215 which provides lower layer control and management of the M2M area network 215. The interface to the M2M core network 262 and the M2M area network 215 may be a wireless or wireline link. When an M2M gateway 220 interfaces with multiple M2M area networks, the M2M gateway 220 may allow for communication between the M2M area networks 215 without requiring access to the M2M access network 252.

The M2M gateway 220 may be a standalone M2M gateway device that includes an interface to the M2M network coordinator(s) and the M2M network and applications domain. Alternatively, the M2M gateway 220 may be a merged M2M gateway+M2M area network coordinator device. Alternatively, the M2M gateway 220 may be a software entity in a converged or centralized home gateway. The embodiments disclosed herein may be applied regardless of the specific implementation of the M2M gateway 220.

The M2M devices 210 may communicate to the network and application domain 250 directly via the access network 252 or through the M2M gateway 220. The M2M devices 210 may perform the procedures such as registration, authentication, authorization, management and provisioning, etc. with the network and application domain 250. The M2M device 210 may have other devices connected to it that are hidden from the network and application domain 250. Alternatively, the M2M devices 210 may be connected to the network and application domain 250 via the M2M gateway 220 via the M2M area network 215, and the M2M gateway 220 may act as a proxy for the M2M network and application domain 250 towards the M2M devices 210 that are connected to it. The M2M gateway 220 may perform procedures such as authentication, authorization, registration, management, and provisioning of the M2M devices 210 connected to it, and may also execute applications on behalf of the M2M network and application domain 250. The M2M gateway 220 may decide on routing service layer requests originating from the applications on the M2M devices 210 locally or to the M2M network and application domain 250. The M2M devices 210 that are connected to the M2M gateway 220 may or may not be addressable by the M2M network and application domain 250.

Figure 3A:
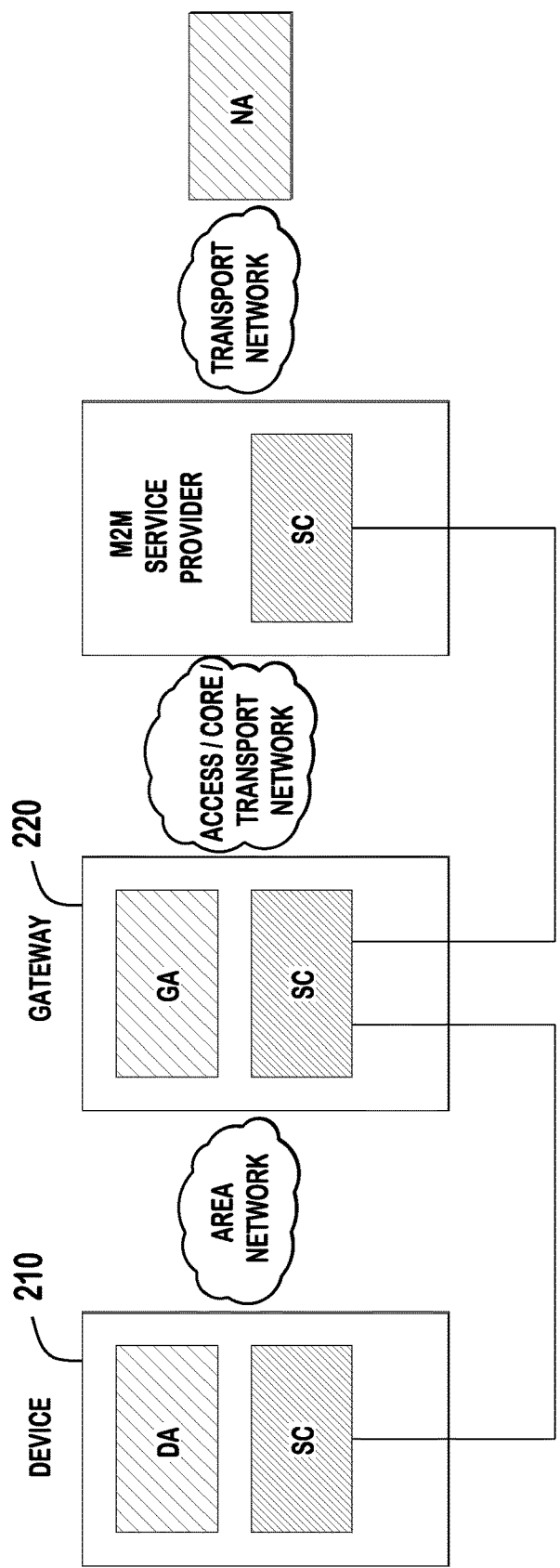
FIGS. 3A and 3B show example hierarchical M2M service capabilities.
Figure 3B:
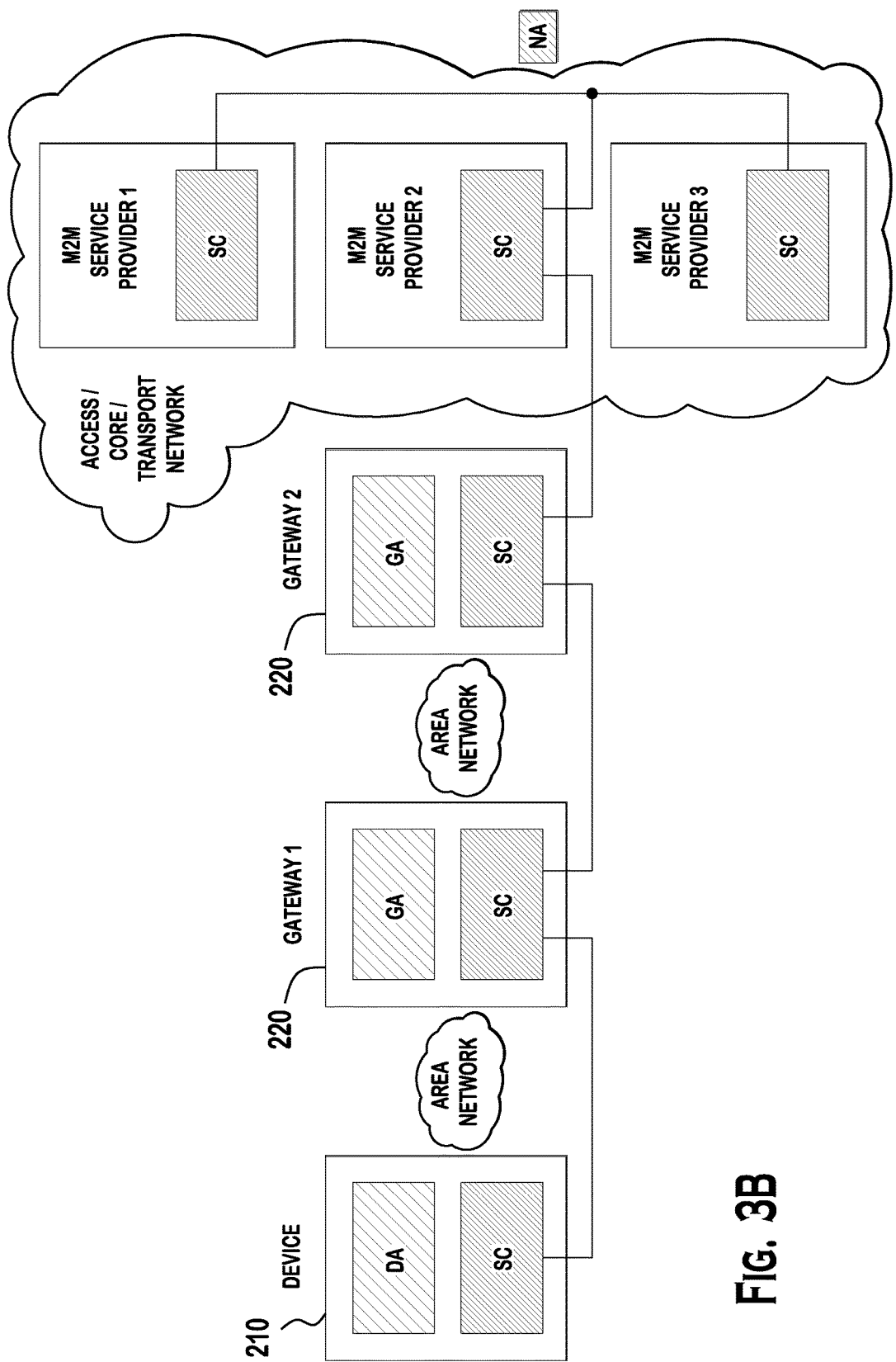

FIGS. 3A and 3B show hierarchical M2M service capabilities. In FIGS. 3A and 3B, NA stands for network application, GA stands for gateway application, DA stands for device application, and SC stands for service capability. The M2M gateways 220 may be employed for system optimization, as they reside between the network applications and a number of M2M devices connected through the M2M area network and linked by a common M2M gateway, as shown in FIG. 3A. This relationship may be extended by replacing one of the connected M2M devices with another gateway which has its own set of connected and linked M2M devices, resulting in hierarchical gateway architecture, as shown in FIG. 3B.

In accordance with one embodiment, the M2M gateway 220 may have one or more of the functionalities related to discovery of service capability across a hierarchical architecture, configuration of service capability across a hierarchical architecture, generic M2M device application enablement (GMDAE), reachability, addressing and device application repository (RADAR), network and communication service selection (NCSS), history and data retention (HDR), security capability (SC), generic M2M network application enablement (GMAE), M2M device and M2M gateway management (MDGM), compensation brokerage (CB) capability, M2M device and M2M gateway proxy (MDGP), location service, or the like. These service capabilities reside in the M2M gateway and may be implemented as service calls from the M2M gateway and device application(s).

Figure 4:
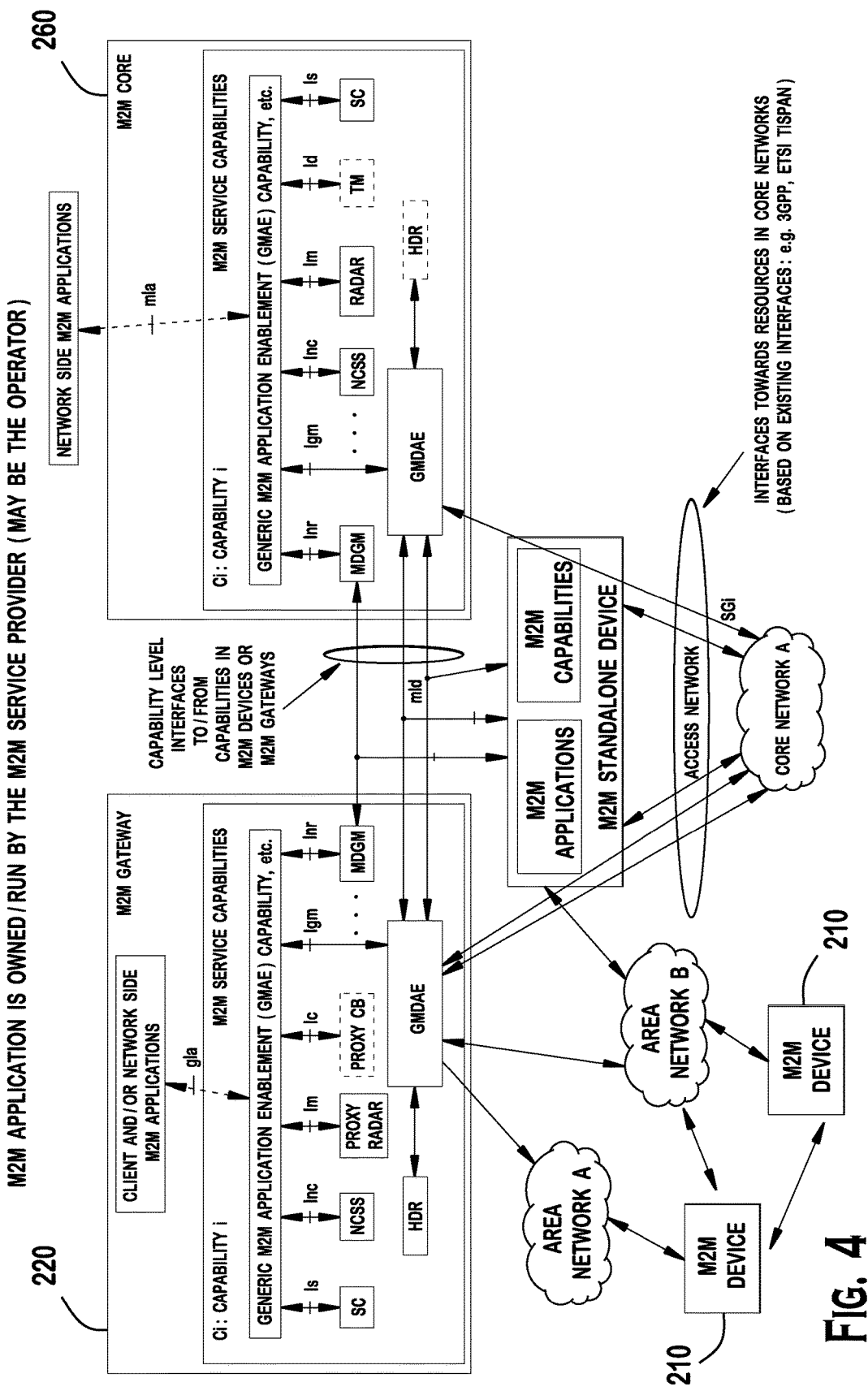
FIGS. 4 and 5 show example services capabilities in the M2M gateway and the M2M core.
Figure 5:
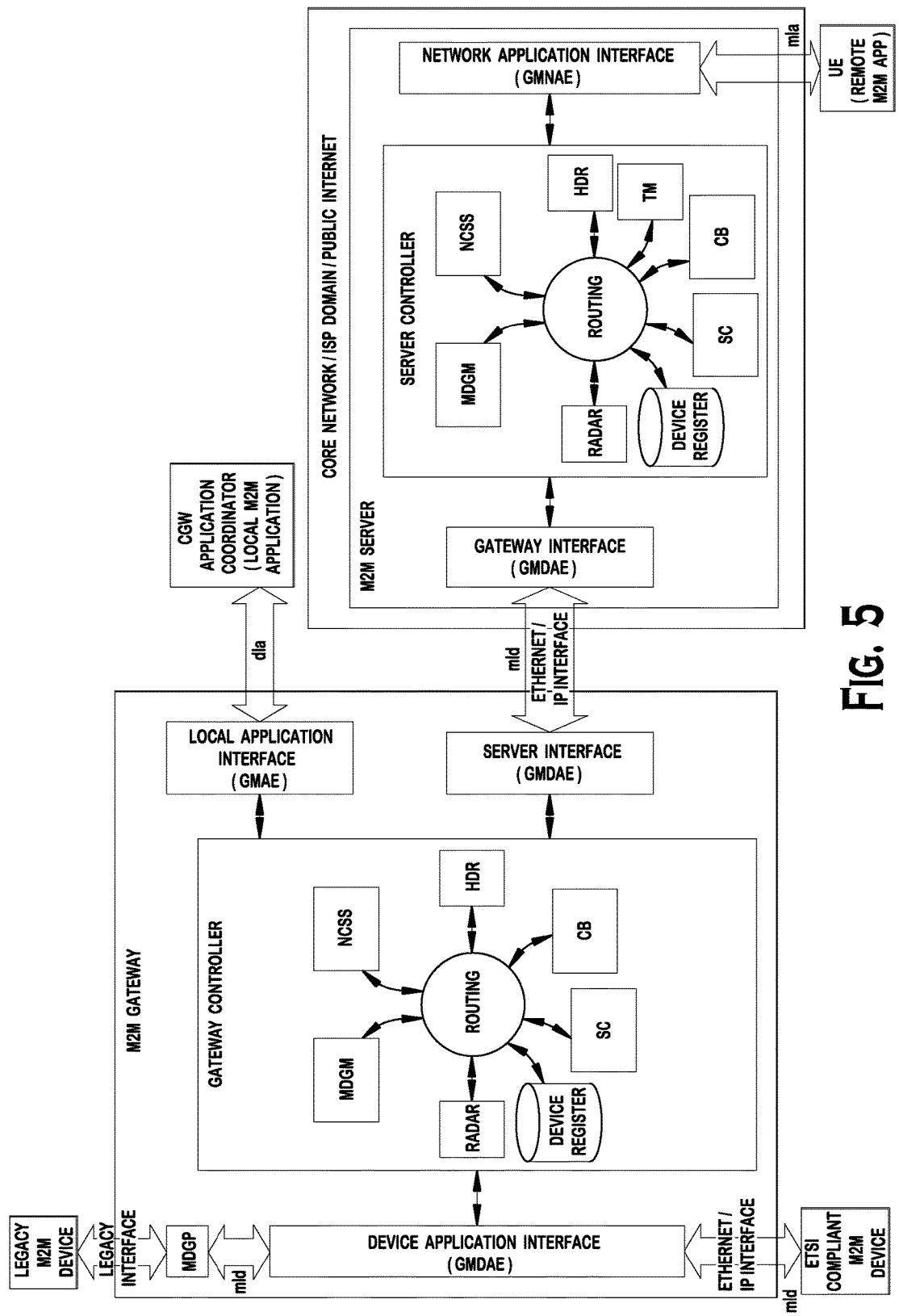

FIGS. 4 and 5 show example services capabilities in the M2M gateway 220 and the M2M core 260. The service capabilities are a grouping of functions that enable end-to-end communication between applications. Service capabilities provide functions that are to be shared by different applications. A service capability layer (SCL) is a generic name for the layer responsible for the service capability functions. The M2M gateway 220 comprises peers of several service capabilities that exist in the network and application domain. The service capabilities perform functions to facilitate management, communications, and security for itself and the M2M devices that it services, or the like. It should be noted that the configuration shown in FIGS. 4 and 5 is an example, and the internal interfaces are implementation specific, and the grouping of functions into service capabilities is arbitrary. For example, the service capabilities are communicating with each other via the GMAE in FIG. 4, but an internal routing function may be provided and the service capabilities may access each other via the internal routing function as shown in FIG. 5.

The functionalities that the service capabilities bring to the M2M gateway are explained hereafter. It should be understood that the assignment of functionalities to a service capability allows for grouping of like functions but this mapping is not a strict requirement. Some functions may be moved to alternative service capabilities, and although some functions are linked, they may be used in any combination.

The GMNAE capability in the M2M gateway may expose functionalities implemented in the gateway service capabilities. The GMNAE capability may perform routing between the M2M gateway application and capabilities. The GMNAE capability may respond to charging record requests from GMNAE capability in the network and application domain. The GMNAE capability may allow an M2M application to register to the M2M gateway service capabilities. The GMNAE capability may perform authentication and authorisation of the M2M applications before allowing them to access a specific set of M2M gateway capabilities. The set of capabilities an M2M application is entitled to access assumes a prior agreement between the M2M application provider and the provider running the service capabilities. The GMNAE capability may check if a specific request is valid before routing it to other capabilities. If a request is not valid an error is reported to the M2M application.

The MGDM capability in the M2M gateway may act as an M2M gateway management client and perform configuration management (CM), performance management (PM), fault management (FM), software and firmware upgrade functions of the M2M gateway, etc. The MGDM capability may act as an M2M gateway management proxy to perform management functions of the M2M devices. The MGDM capability may perform network mobility, and allow the M2M server to subscribe to notifications that may be triggered by various events in the M2M gateway and within the capillary network. An M2M server refers to an entity in the network and application domain, which is capable of hosting the M2M service capabilities.

The MGDM capability may have the ability to assess quality of service (QoS) and latency request in the M2M area network. The MGDM capability may have the ability to assess and manage potential bandwidth aggregation opportunities within the M2M area network. For example, the M2M gateway may split or load balance data traffic targeting a specific device by routing the data packets through multiple routes within the capillary network or over multiple radio access technologies (RATs), provided the devices support multi-RAT capability. The MGDM capability may have spectrum and interference management within the capillary network, (e.g., the ability to issue requests for spectrum to use, and the ability to make measurement reports to some central entity, etc.)

The security capability in the M2M gateway may manage security keys by means of bootstrap of security keys, (e.g., pre-shared security keys, certificates, etc.), in the M2M device for authentication. The security capability in the M2M gateway may perform authentication before session establishment if required by the application. The security capability in the M2M gateway may perform session security related functions such as encryption of traffic and integrity protection for signaling messages.

The GMDAE capability in the M2M gateway may relay messages received from the GMDAE capability in the service provider towards the M2M devices, relay messages received from the M2M devices to the GMDAE capability in the service provider, and relay messages addressed to M2M applications or other capabilities in the M2M gateway. The GMDAE capability may provide intra M2M area network transmission of a message sent by an M2M device to another M2M device connected to the same M2M gateway. The GMDAE capability may handle name resolution for messages sent from unicast messaging (UM) capability in the service provider towards an M2M device. The GMDAE capability may report errors, (e.g., the identifier of the recipient does not exist, the requested service class is not supported by the recipient, or the like). The GMDAE capability may deliver messages using a requested or a default service class.

The GMDAE capability may store and forward proxy capability such that data that is destined for a sleeping device may be stored by the M2M gateway, and forwarded once the device wakes up. The GMDAE capability may behave as a group communication proxy (support multicast, anycast, unicast). For example, a data packet targeting multiple devices under the control of the M2M gateway may be received once by the M2M gateway and multicast to multiple devices in an efficient way. This may rely on advanced broadcasting capabilities that consider the duty cycle of the devices in the capillary network. The GMDAE capability may respond to requests to inspect traffic generated by a particular M2M device and verify it is matching a given traffic pattern. The GMDAE capability may have caching functionality to allow the M2M gateway to service incoming requests from the M2M core using cached versions of the M2M device information, (e.g., for the case where a device may be sleeping). The GMDAE capability may have scheduling functionality to allow the M2M gateway to intelligently schedule messages from the M2M devices to the M2M core based on criteria such as device service class. The GMDAE capability may have concatenation functionality to allow the M2M gateway to consolidate smaller M2M device messages into larger messages that are sent to the M2M core. The GMDAE capability may have protocol translation functionality to allow the M2M gateway to translate between the protocols used in the area network and the protocols used in the access network. For example, the GMDAE may translate from hyper text transport protocol (HTTP) to constrained application protocol (CoAP) at the application layer.

The M2M gateway may have a proxy RADAR capability. The gateway RADAR capability may provide a mapping between the name of a M2M device and one or more network addresses, provide a mapping between the name of a group of M2M devices and one or more network addresses for each M2M device within the group, provide reachability status of an M2M device, provide the next planned wake-up time and wake-up duration, if available, use a mechanism for having the mapping table updated when an M2M device becomes reachable, provide notification on events related to the M2M devices, (e.g., a specific M2M device becomes reachable, changes occur on a set of M2M applications registration information, etc.), and allow to create, delete and list a group of M2M devices. The gateway RADAR may maintain the device application (DA) and gateway application (GA) repository by storing in the DA and GA repository the M2M device or M2M gateway application registration information and keeping this information up to date, by providing a query interface to properly authenticated and authorized entities for them to be able to retrieve DA and GA information stored in the repository, by storing in the DA and GA repository a subset of DA/GA data that may be read by the authenticated and authorized entities, or by providing a subscription/notification mechanism that allows an authenticated and authorized entity to be notified upon DA/GA data update.

The NCSS capability in the M2M gateway may perform access network (backhaul network) selection based on QoS, service class, available power, transmission cost, or any other metrics. The NCSS capability may determine minimum service required based on the devices behind the M2M gateway. The NCSS capability may takes into account the varying needs of the M2M devices behind the M2M gateway or the location of neighbors. The NCSS capability may perform capillary network selection based on QoS. The NCSS capability may choose between various capillary networks or may tailor the capillary network to meet certain requirements (such as latency, throughput, etc.). For instance, the NCSS capability may decide to split a capillary network for load balancing reasons. The NCSS capability may perform gateway selection and/or handover. The NCSS capability may maintain neighbor gateway information (like frequency used, protocol, how many devices, etc.). It may negotiate with neighbor gateways in order to force a device to go from one gateway to another, (i.e., handover). The NCSS capability may have the ability to assess and manage potential bandwidth aggregation opportunities within the M2M area network. For example, the M2M gateway may split or load balance data traffic targeting a specific device by routing the data packets through multiple routes within the capillary network or over multiple RATs, provided the devices support multi-RAT capability. The NCSS capability may perform spectrum and interference management in the capillary network. The NCSS capability may have the ability to issue requests for spectrum to use, and the ability to make measurement reports to some central entity.

The M2M gateway may have the HDR proxy capability. The HDR proxy capability may hide the historization and data retention tasks from the M2M application and the devices in the local network. The HDR proxy capability may archive relevant transactions, for example, in raw message format, (i.e., without any payload interpretation), based on application and/or device profile. The HDR proxy capability may interact with the HDR function residing in the M2M core network and support hierarchal HDR for managing data. The HDR proxy capability may interact with other capabilities residing in the M2M gateway to determine if and which information requires to be retained, or obtain the information to be stored from capability involved, etc.

The M2M gateway may have a CB proxy capability. The CB proxy capability may maintain billing and charging information for the core network. The CB proxy capability may be a single contact point to the M2M gateway's application on the network side or the client side, and may generate charging records pertaining to the use of capabilities.

The MDGP capability in the M2M gateway may interwork with the gateway MDGM and the device or gateway management functions, and/or interwork between the gateway GMDAE and the device or gateway proprietary communication means. In order to aggregate signaling and traffic at the M2M gateway, the M2M gateway may manage both standard-non-compliant M2M devices and standard-compliant M2M devices (such as ETSI compliant devices). The MDGP entity may interface with the standard non-compliant M2M devices. The MDGP entity may interface directly with the GMDAE. The service capabilities function residing in the M2M gateway may have access to the devices (standard compliant and non-compliant devices) through the GMDAE as shown in FIG. 5. Alternatively, the MDGP entity may interface to the GMAE, thereby behaving identically to an application running at the gateway.

The M2M gateway may have a location service capability. The location service capability may determine location information for devices behind the gateway, which may be derived based on global positioning system (GPS) information, area network routing tables, gateway triangulation, etc. The location service capability may store location information. The information may be relative to the gateway position or may be absolute. The location service capability may provide an interface to authenticated entities to query the location information of the M2M devices.

The M2M gateways may be categorized into a plurality of classes in terms of a minimal set of functionalities that they provide. In one embodiment, the M2M gateways may categorized into three classes, (low, mid, and high tier gateways). For example, the low-tier gateway may support GMDAE, SC, MDGM, MDGP, and some RADAR functionality. The mid-tier gateway may support GMDAE, SC, MDGM, MDGP, and RADAR functionalities that allow for full, limited, or no visibility to the entities behind the gateway. The high-tier gateway may support more functionalities, and have full RADAR functionality, which permits inter-gateway communication, allowing the service capabilities to share information. It should be noted that the above categorizations and functionalities for each class are provided as examples, and the gateways may be categorized into any number of classes and the functionalities required for each class may be defined in any conceivable way.

Figure 6A:
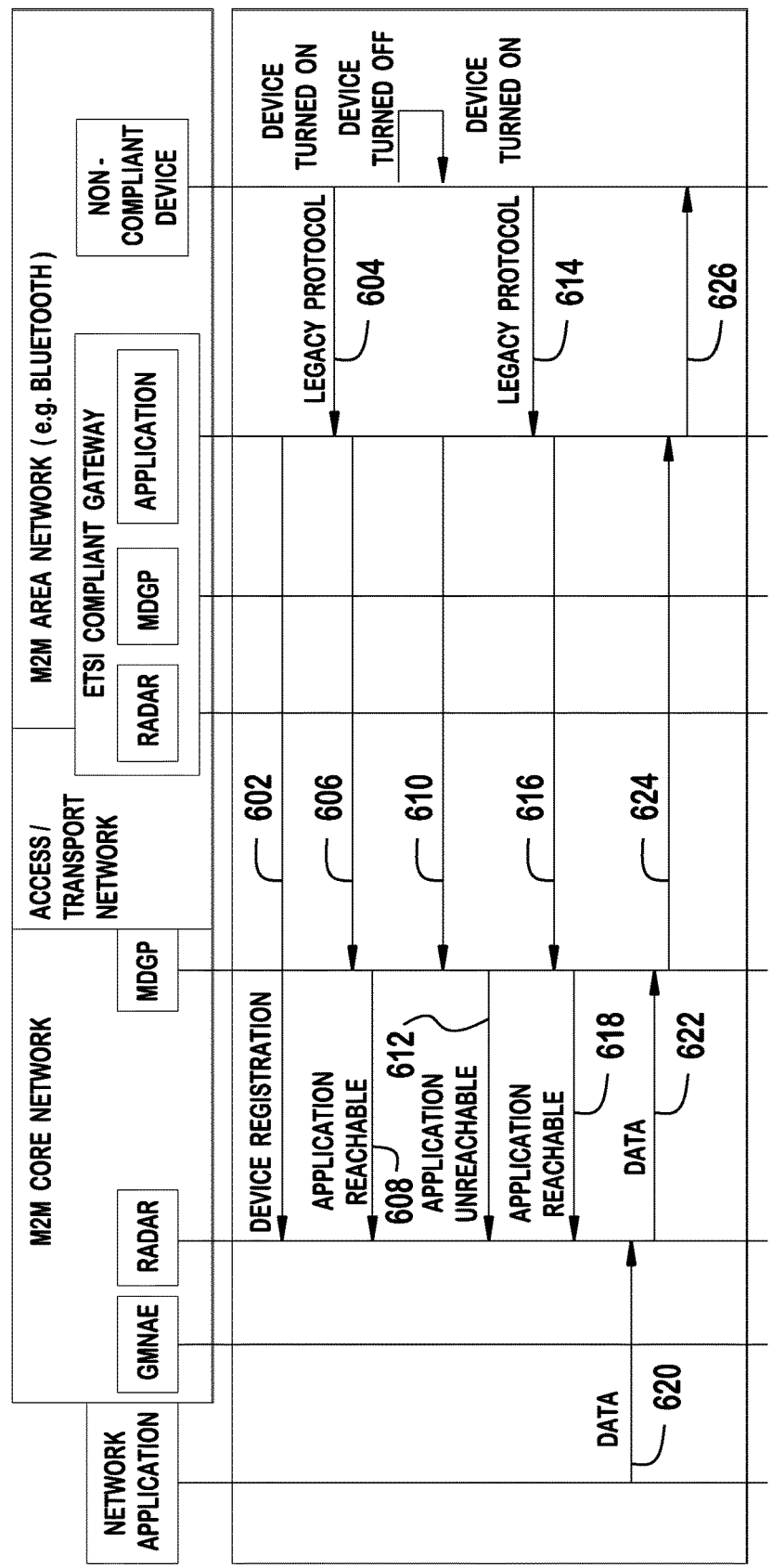
FIG. 6A is an example call flow for the low-tier gateway with no gateway proxying.

FIG. 6A is an example call flow for the low-tier gateway with no gateway proxying. In this example, the M2M device is a non-compliant device so that the MDGP in the core network performs interworking. The gateway performs registration with the RADAR in the M2M core network (602). The M2M device makes a connection to the gateway when it is turned on (604). The gateway then registers the device with the RADAR in the core network (606, 608). As the device is registered, device information, (for example, registration information, device capability, sleep cycle, reachability status, device address, or the like), may be stored in the RADAR. When the device is turned off, the gateway detects it and updates the RADAR via the MDGP as the application unreachable (610, 612). When the device is turned on again, the connection between the device and the gateway is reestablished (614), and the gateway updates the RADAR via the MDGP as the application reachable (616, 618). When data destined to the devices arrives to the RADAR (620), which has the device information, the data is forwarded to the device via the MDGP in the core network, and via the gateway (622, 624, 626).

Figure 6B:
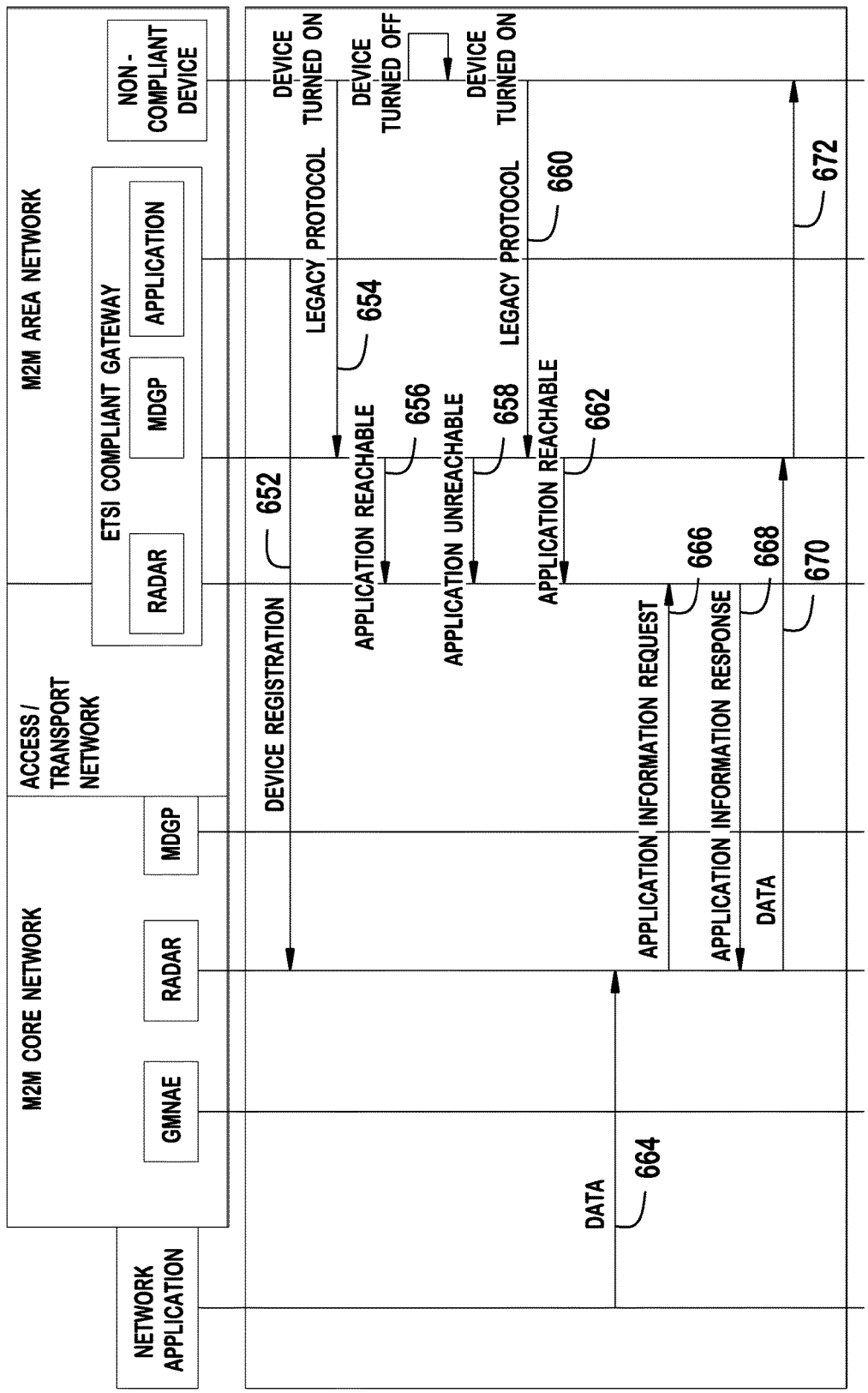
FIG. 6B is an example call flow for the low-tier gateway with gateway proxying.

FIG. 6B is an example call flow for the low-tier gateway with gateway proxying. The gateway performs registration with the RADAR in the M2M core network (652). The M2M device makes a connection to the gateway when it is turned on (654). In this example, the M2M device is a non-compliant device so that the MDGP in the gateway interworks with the device. With the gateway proxying, the gateway registers the device with the RADAR in the gateway (656). As the device is registered, device information, (e.g., registration information, device capability, sleep cycle, reachability status, device address, or the like), may be stored in the RADAR of the gateway. When the device is turned off, the gateway detects it and updates the RADAR in the gateway as the application unreachable (658). When the device is turned on again, the connection between the device and the gateway is reestablished (660), and the gateway updates the RADAR in the gateway as the application reachable (662). When data destined to the device arrives at the RADAR in the core network (664), the RADAR in the core network sends an application information request to the RADAR proxy in the gateway (666), and the RADAR proxy in the gateway responds with the application information (668). The data is then forwarded to the device via the MDGP in the gateway (670, 672). With gateway proxying, the signaling load may be reduced.

Figure 7A:
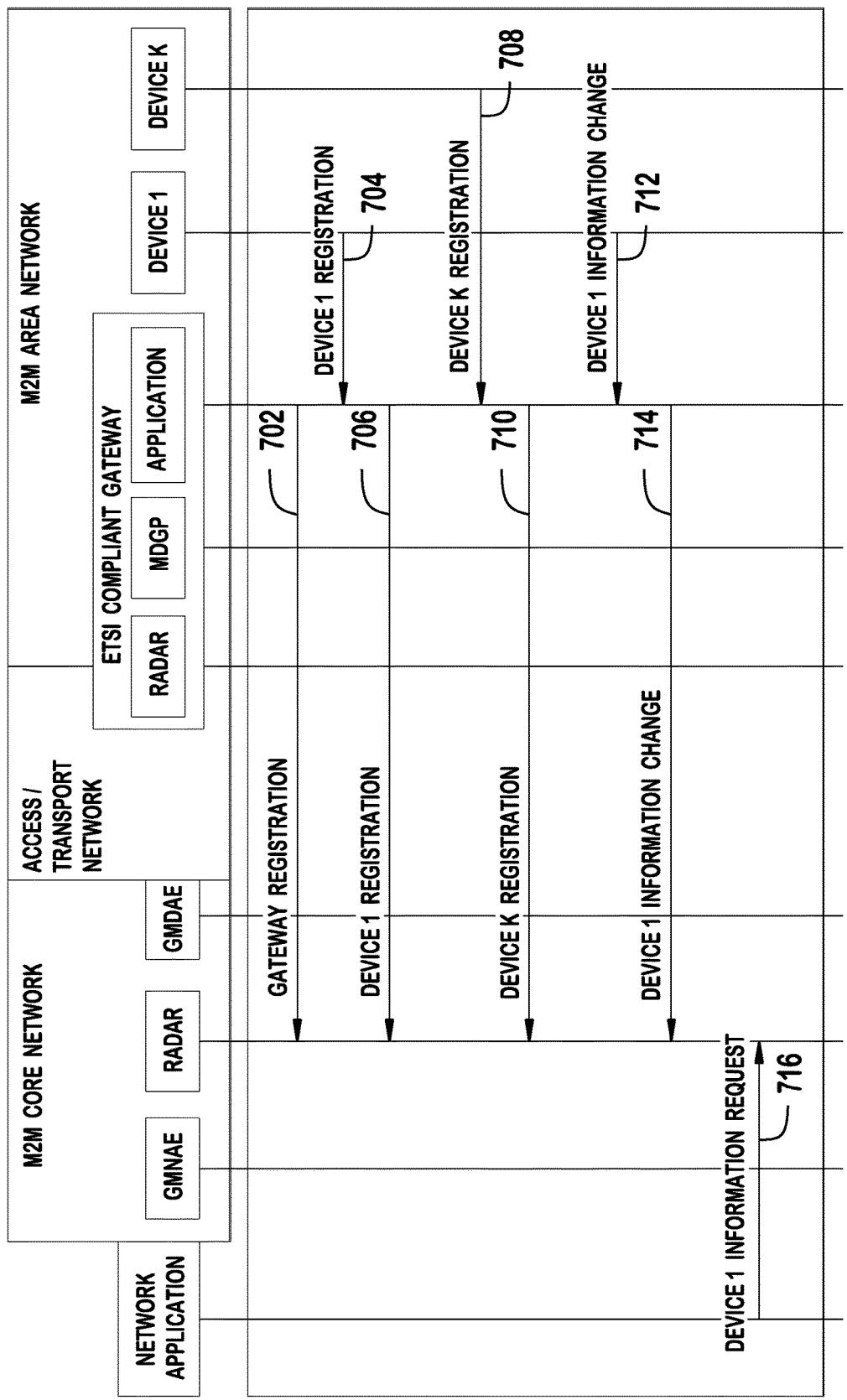
FIG. 7A is an example call flow for the mid-tier gateway with no gateway proxying.

FIG. 7A is an example call flow for the mid-tier gateway with no gateway proxying. In this example, the M2M devices are compliant devices. The gateway performs registration with the RADAR in the M2M core network (702). M2M device 1 performs registration with the RADAR in the core network via the gateway (704, 706). M2M device K also performs registration with the RADAR in the core network via the gateway (708, 710). As the devices are registered, device information, (e.g., registration information, device capability, sleep cycle, reachability status, device address, or the like), may be stored in the RADAR in the core network. When M2M device 1 information changes, the M2M devices updates the RADAR in the core network via the gateway (712, 714). The application in the network may request for device information from the RADAR (716).

Figure 7B:
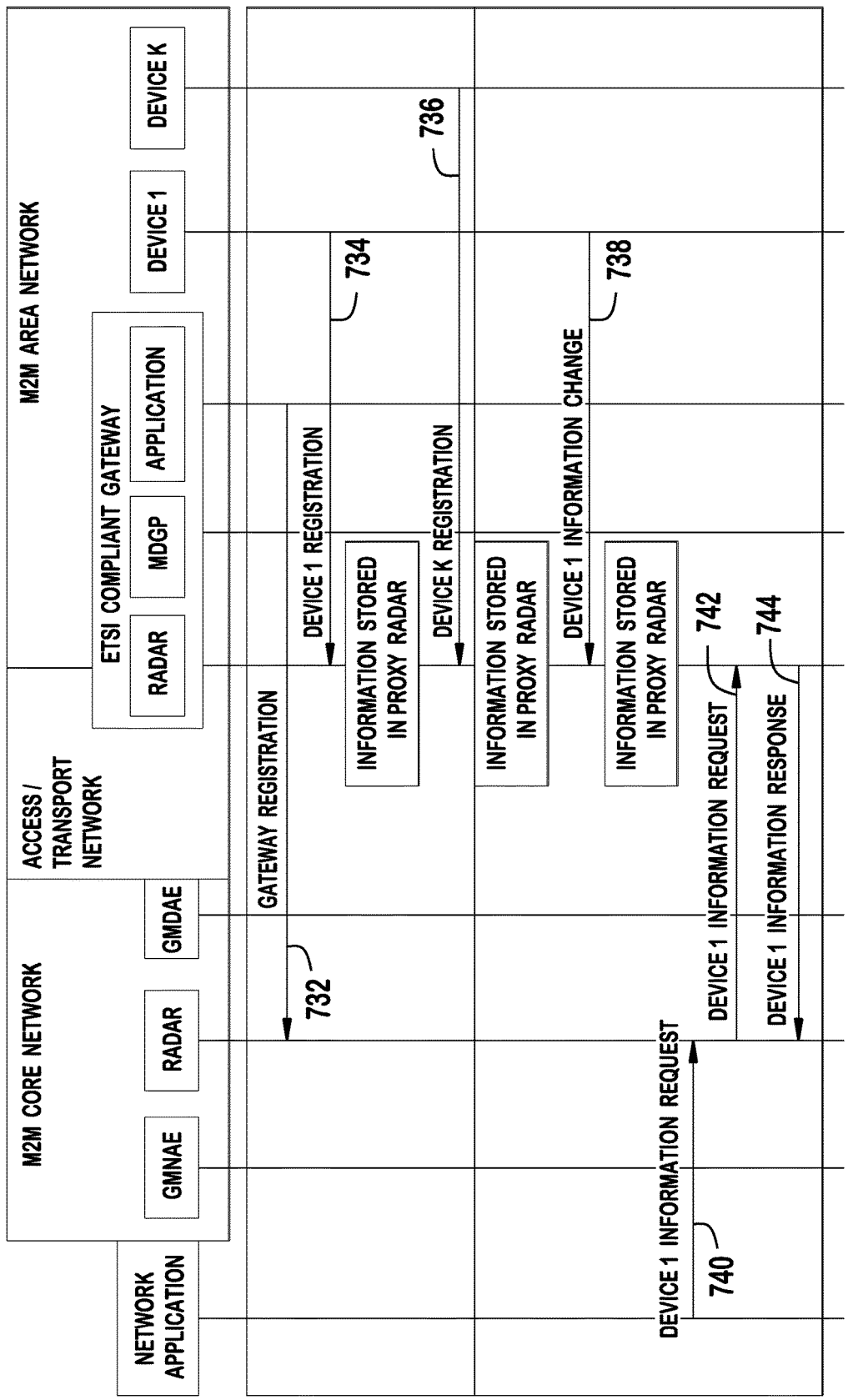
FIG. 7B is an example call flow for the low-tier gateway with gateway proxying and no visibility.

FIG. 7B is an example call flow for the low-tier gateway with gateway proxying and no visibility. In this example, the M2M devices are compliant devices. The gateway performs registration with the RADAR in the M2M core network (732). M2M devices 1 and K perform registration with the gateway (734, 736). Since gateway proxying is used, device information, (such as registration information, device capability, sleep cycle, reachability status, device address, or the like), is stored in the RADAR proxy in the gateway as devices perform registration. When M2M device 1 information changes, such change is updated with the RADAR proxy in the gateway (738). With no visibility, the core network does not have information of the device beyond the gateway. When the application in the network requests device information to the RADAR in the network (740), the RADAR in the network retrieve the device information from the RADAR in the gateway (742, 744).

Figure 7C:
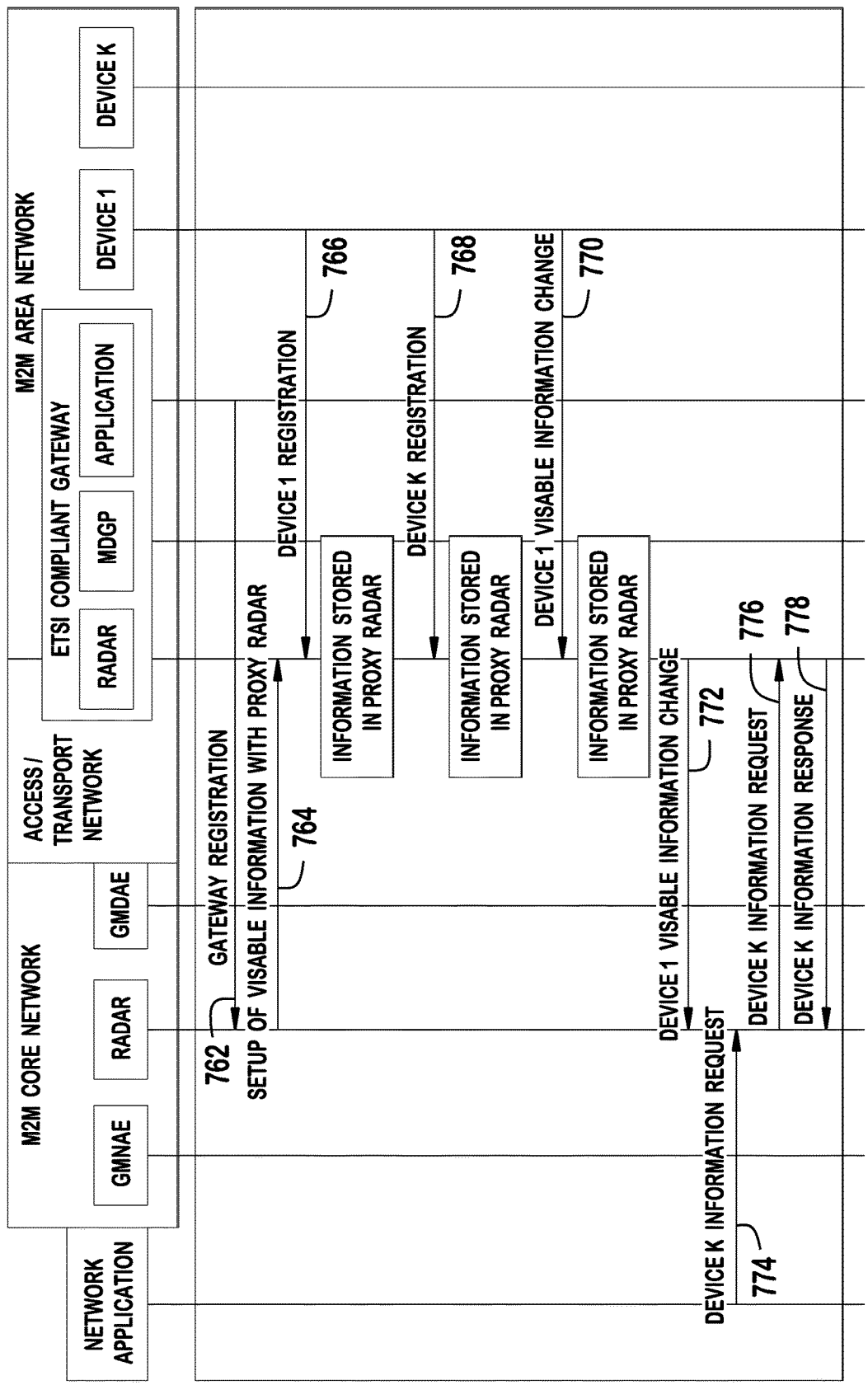
FIG. 7C is an example call flow for the low-tier gateway with gateway proxying and partial visibility.

FIG. 7C is an example call flow for the low-tier gateway with gateway proxying and partial visibility. In this example, the M2M devices are compliant devices. The gateway performs registration with the RADAR in the M2M core network (762). The RADAR in the core network sets up visible information with the RADAR proxy in the gateway so that the core network may have partial information about the devices beyond the gateway (764). M2M devices 1 and K perform registration with the gateway (766, 768). Since gateway proxying is used, device information, (such as registration information, device capability, sleep cycle, reachability status, device address, visible information, or the like), is stored in the RADAR proxy in the gateway as devices perform registration. When M2M device information changes (device 1 in this example), such change is updated with the RADAR proxy in the gateway (770).

If the device visible information changes, the RADAR proxy in the gateway updates it with the RADAR in the core network (772). When the application requests device information (Device K in this example) (774), the RADAR in the network may retrieve the device information for Device K from the RADAR proxy in the gateway if RADAR in the network does not have it (776, 778).

Figure 8A:
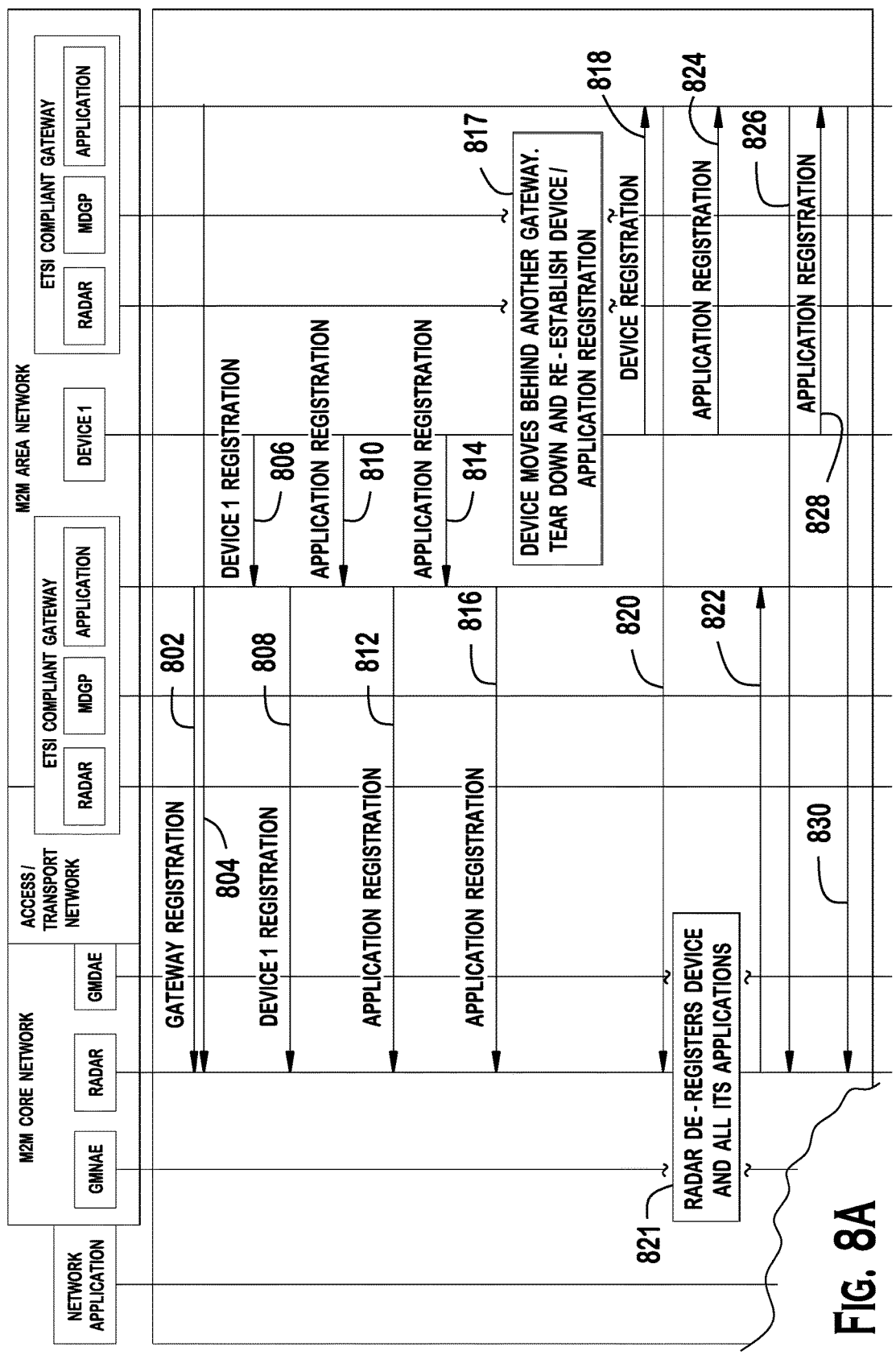
FIG. 8A is an example call flow for the high-tier gateway with no gateway proxying.

FIG. 8A is an example call flow for the high-tier gateway with no gateway proxying. In this example call flow, the device supports mobility behind a gateway. Due to mobility, the device may change its parent gateway. In this example, the M2M device is a standard compliant device. Gateway 1 and 2 perform registration with the RADAR in the M2M core network (802, 804). The M2M device is currently connected to gateway 1, and performs registration with the RADAR in the core network via gateway 1 (806, 808). As the devices are registered, device information, (e.g., registration information, device capability, sleep cycle, reachability status, device address, or the like), may be stored in the RADAR in the core network. The M2M device performs application registration with the RADAR in the core network via gateway 1 (810-816). The device may run multiple applications, and may perform multiple application registrations (two in this example).

The device moves behind gateway 2 and may tear down and reestablish device/application registration (817), and performs a procedure to register the device via the gateway 2 (818, 820). When the RADAR in the core network receives device registration for the device via gateway 2 (820), the RADAR de-registers all applications of the device and signals it to gateway 1 (821, 822). The device performs application registration(s) via gateway 2 (824-830).

Figure 8B:
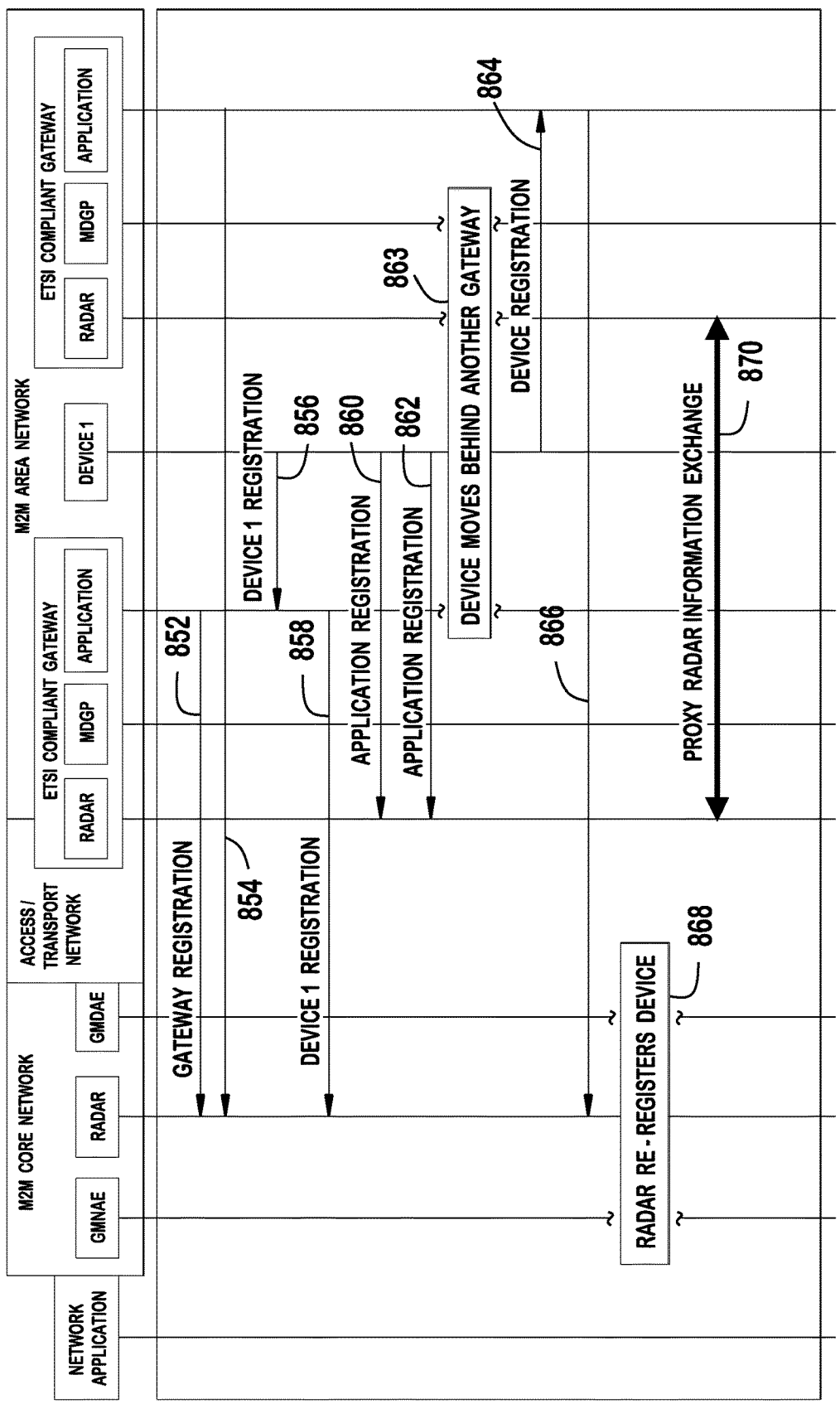
FIG. 8B is an example call flow for the high-tier gateway with gateway proxying and RADAR and mobility support.

FIG. 8B is an example call flow for the high-tier gateway with gateway proxying and RADAR and mobility support.

In this example call flow, the device supports mobility behind a gateway. Due to mobility, the device may change its parent gateway. In this example, the M2M device is a compliant device. Gateway 1 and 2 perform registration with the RADAR in the M2M core network (852). The M2M device is currently connected to gateway 1, and performs device registration with the RADAR in the core network via gateway 1 (856, 858). As the devices are registered, device information, (e.g., registration information, device capability, sleep cycle, reachability status, device address, or the like), may be stored in the RADAR in the core network. The M2M device performs application registration with the gateway 1 as gateway proxying is used (860, 862). The device may run multiple applications, and therefore may perform multiple application registrations (two in this example).

The device moves behind gateway 2 (863), and performs a procedure to register the device with the core network via gateway 2 (864, 866). When the RADAR in the core network receives device registration for the device via gateway 2, the RADAR de-registers the device with respect to gateway 1, and re-registers the device with respect to gateway 2 (868). The RADAR proxies in gateway 1 and gateway 2 exchange proxy RADAR information for the device (870). Therefore, there is no need to tear-down and re-establish the sessions as proxy RADARs communicate and the device do not have to perform application registration again after moving behind gateway 2.

Figure 9A:
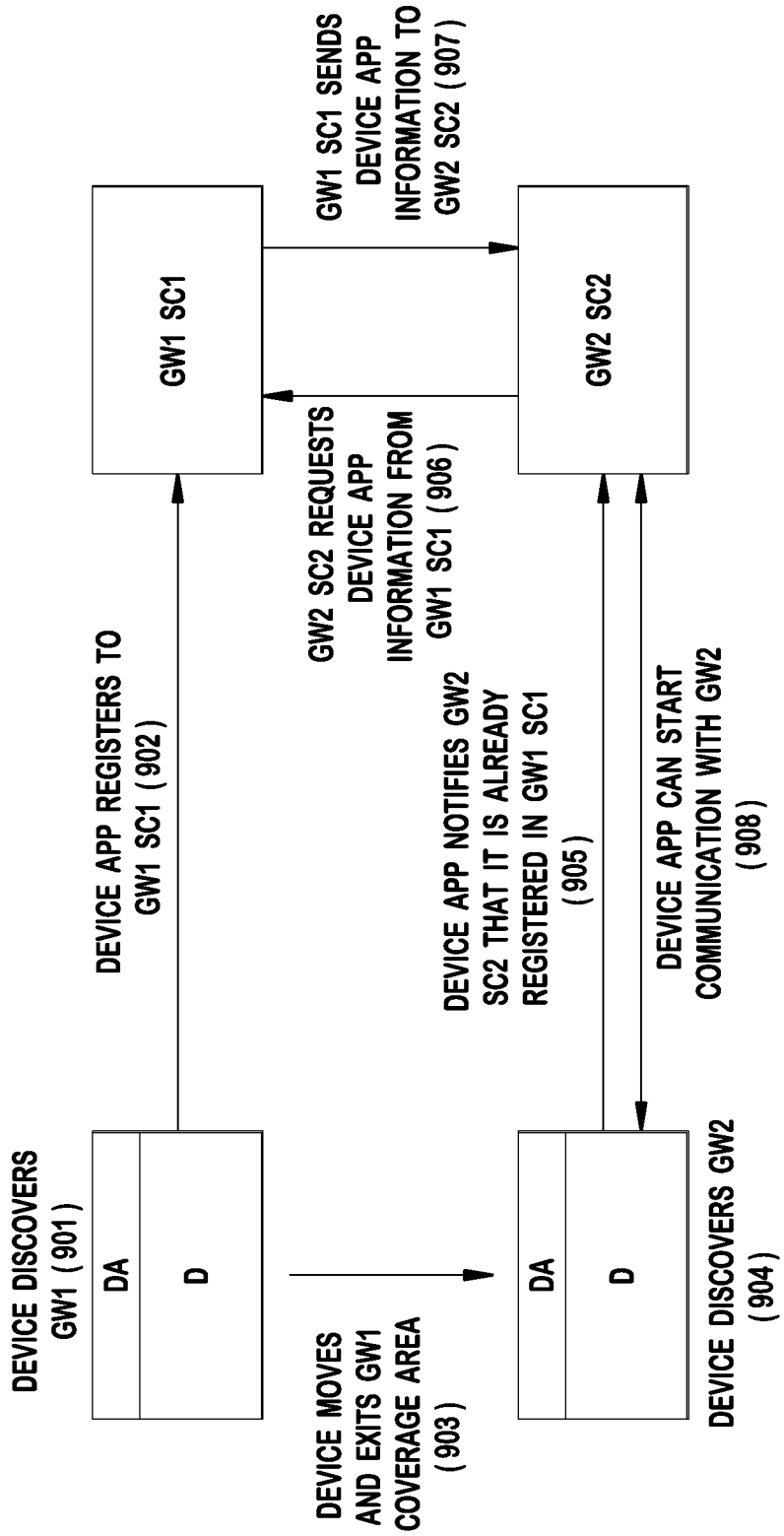
FIGS. 9A-9C are example call flows for mobility support.
Figure 9B:
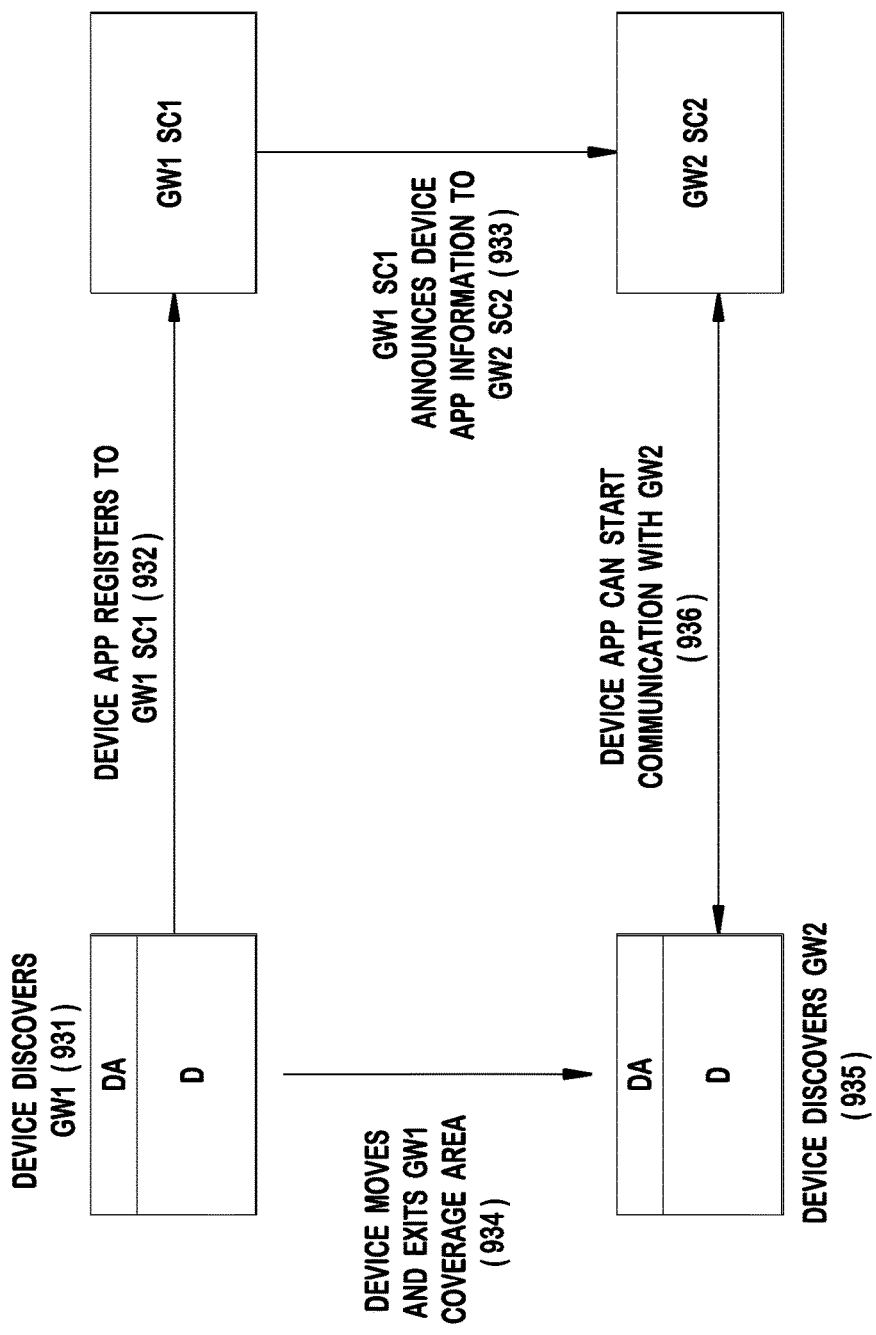
Figure 9C:
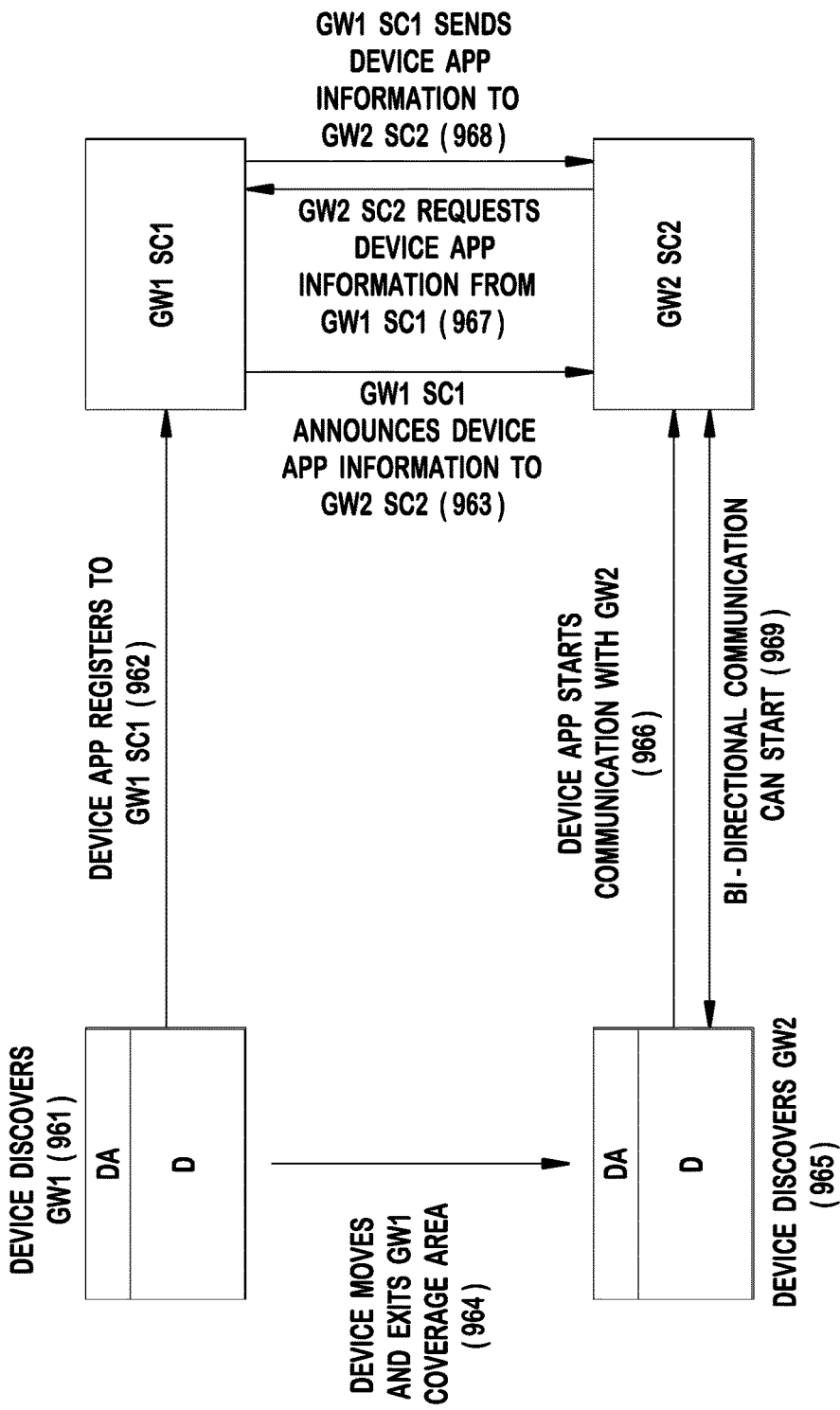

FIGS. 9A-9C are example call flows for mobility support. In FIG. 9A, the device discovers gateway 1 (901) and performs application registration with gateway 1 (902)). The device moves and exits gateway 1 coverage and enters gateway 2 coverage (903). The device discovers gateway 2 (904). The device application notifies gateway 2 service capability that the device is already registered with gateway 1 (905). Gateway 2 requests device application information from gateway 1 (906). Gateway 1 sends device application information to gateway 2 (907). The device application may then start communication with gateway 2 (908). In FIG. 9A, gateway 1 shares the necessary information regarding the application with gateway 2. Since gateway 2 already has the information on the given application, the application does not need to re-register.

In FIG. 9B, the device discovers gateway 1 (931) and performs application registration with gateway 1 (932)). Gateway 1 announces device application information to gateway 2 (933). The device moves and exits gateway 1 coverage and enters gateway 2 coverage (934). The device discovers gateway 2 (935). Since the gateway 2 has the device application information, the device application may start communication with gateway 2 (936). Gateway 1 and gateway 2 may exchange signaling so that they are aware that device application is now communicating with gateway 2.

In FIG. 9C, Gateway 1 may share partial information regarding the application with gateway 2. This partial information may be sufficient so that gateway 2 may be able to recognize the application when the application starts communicating with gateway 2. For example, this may be the IP address and port number of the application. This minimizes the amount of information that needs to be maintained in the gateways, still allowing registration information to be shared among gateways. The device discovers gateway 1 (961) and performs application registration with gateway 1 (962)). Gateway 1 announces partial device application information to gateway 2 (963). The device moves and exits gateway 1 coverage and enters gateway 2 coverage (964). The device discovers gateway 2 (965). The device starts communication with gateway 2 (966). Gateway 2 requests device application information from gateway 1 (967). Gateway 1 provides the device application information to gateway 2 (968). Bi-directional communication between the device and gateway 2 then starts (969). The application does not need to re-register.

Figure 10:
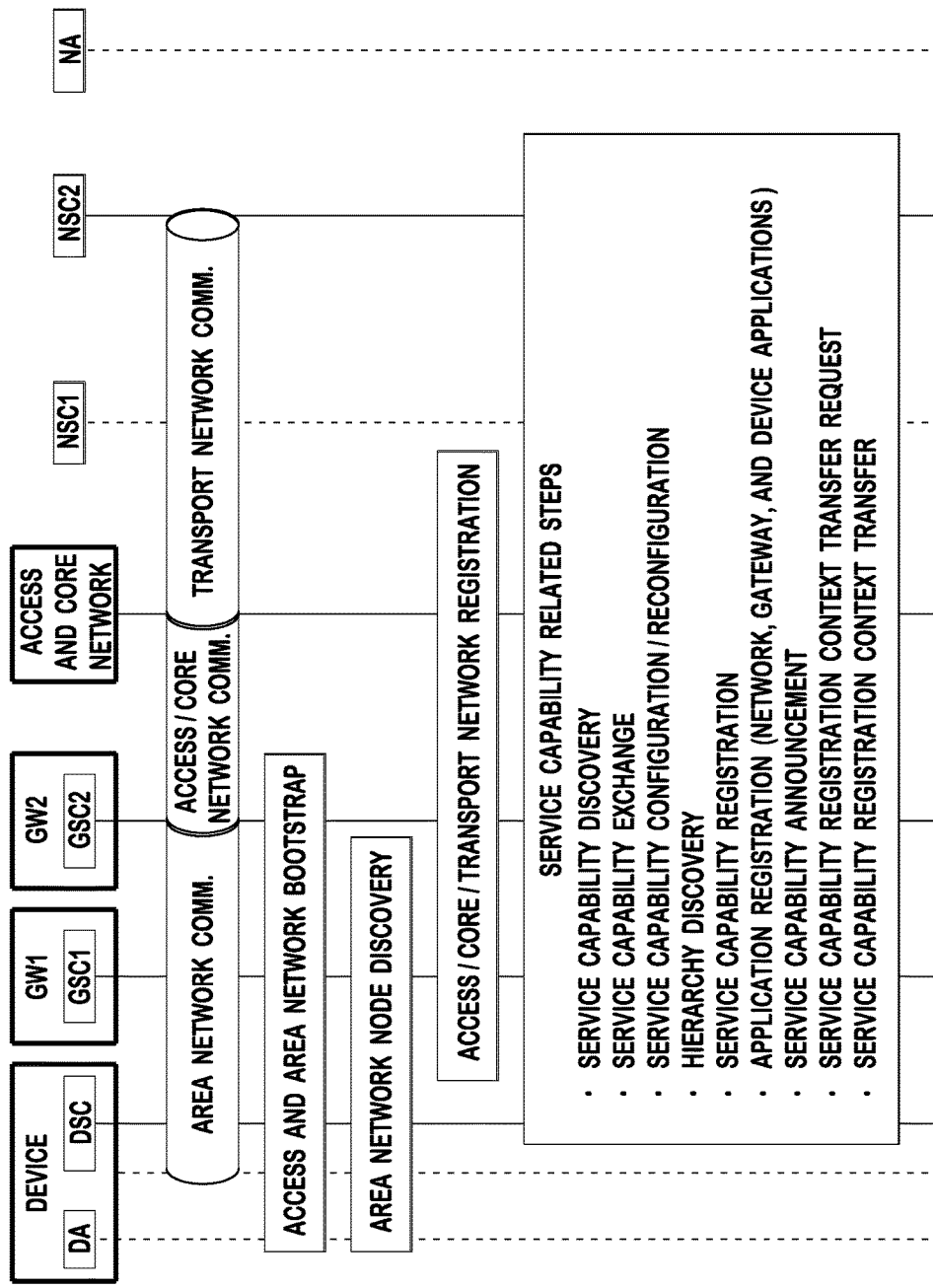
FIG. 10 shows high level flows of operational procedures performed for M2M communications.

FIG. 10 shows high level flows of operational procedures performed for M2M communications. It should be noted that FIG. 10 shows a hierarchical architecture as an example for a device behind two gateways in an M2M system and with two M2M service providers, but it may be generalized to any hierarchical structures. The device, the gateway, and the network have a set of service capabilities (device service capability (DSC), gateway service capability (GSC), and network service capability (NSC)), respectively.

The operational procedures include access and area network bootstrap, area network node discovery, access/core/transport network registration, and service capability-related steps. The service capability-related steps include, but are not limited to, service capability discovery, service capability exchange, service capability configuration/re-configuration, hierarchy discovery, service capability registration, application registration (network, gateway, and device applications), service capability announcement, service capability registration context transfer request, service capability registration context transfer, or the like.

The device and the gateway may need to bootstrap access network identity, related security parameter, area network parameters, etc.

In the area network node discovery procedure, the device discovers and connects to the gateway. The area network node discovery procedure may be standard-aware in order to assist service capability discovery.

During the network registration, the gateway registers with the access/core network. As part of this procedure, the gateway may be assigned an IP address from the core network. A registration procedure is a procedure by which a registration SCL authenticates and authorizes a source SCL or an application to use service capabilities within the registration SCL. A registration SCL refers to an SCL that hosts the registration context for a source SCL or for an application that has performed a registration procedure. A source SCL is an SCL that initiates a registration procedure. The entity hosting the source SCL may be a device or gateway service capability layer. Registration attributes refer to characteristics of entities, (i.e., devices, gateways, etc.), that are allowed to register. The characteristics may relate to physical characteristics (available power, available capacity), identification, service class, etc. These attributes form part of the registration context associated with the SCL of the entity.

Each of the service capability-related steps are explained in detail hereafter. It should be noted that in the following sections, numerous functions and messages are not intended to limit the scope of their use, but may be interchanged, combined or executed in another step. For instance, the SC_Advertisement message may overlap or be combined, with the capability indication message, the SC_Probe operation may be combined with the capability request operation, and the traceSC message may be issued simultaneously with the SC_Probe, etc.

Entities, (such as devices, gateways, and core networks that may be standard, (e.g., ETSI), compliant), may perform service capability discovery and maintain a database with information about the discovered service capabilities. The amount of information in the database may depend on the role of the entity. For instance, a registration SCL may need a very detailed SC database in order to allow proper SC delegation. In contrast, a low-powered M2M end device may need to know the location of its registration SCL. In order to populate the SC database an entity may need to first discover other entities that have potential service capabilities by one of the following service capability discovery procedures.

In accordance with one embodiment, the SCLs may be pre-configured (in software or in hardware) with the identity or address of other SCLs. For instance, an SCL in the network service provider may know the identity or address of the SCL of another network service provider. For example, the identity or the address may be IP address, port number, or the like, and it may be dependent on implementation.

In accordance with another embodiment, the SCLs may be pre-configured (in software or in hardware) with the identity or address of a dispatcher server that responds to queries from an SCL with a list of potential service capabilities that may be used in the network. The source SCL may provide additional information to the dispatcher server so that the dispatcher server may tailor the list of returned SCL identities or addresses (SCL address list). For example, a gateway service capability may provide an indication that it is behind another gateway. The dispatcher server may then return the identity or address of that gateway, which may then be used for the subsequent capability exchange.

In accordance with another embodiment, if an entity is in a local network, it may leverage the local network communication and use a plug-n-play approach to determine the location of potential service capabilities. The procedure enables the entity to be provisioned and configured without any human intervention at the device level (either during service or during fabrication). The procedure may rely on: (1) the local network subscribing to service capabilities that are linked to specific M2M use cases, with these use cases identified by the known M2M service identifiers, and (2) the entity knowing its M2M service identifier. Table 1 shows examples of the M2M service identifiers. It is assumed that the entity (or entities) in the local network subscribed to service capability layers. That is, the entity has registered to a set of service capability layers and has associated to each of these service capabilities the known M2M service identifier supported. This may be a simple table of M2M service identifier and corresponding SCL identity/address tagged to deal with entities of this type. The local network may provide this address/identity to the entity, (e.g., through the SCL in the M2M gateway).

TABLE 1

| Primary M2M Service Identifier | Primary Code | Secondary M2M Service Identifier | Secondary Code |
|---|---|---|---|
| E-health | 1 | Not provided or N/A | 1 |
| Electricity Utility | 2 | Thermostat | 2 |
| Consumer Electronics | 3 | Heart beat monitoring | 3 |
| Industrial Application | 4 | Electricity meter | 4 |
| Gas Utility | 5 | Camera | 5 |
| Security System | 6 | Television, display | 6 |
| | | Voltage meter | 7 |
| | | Current control | 8 |

Figure 11:
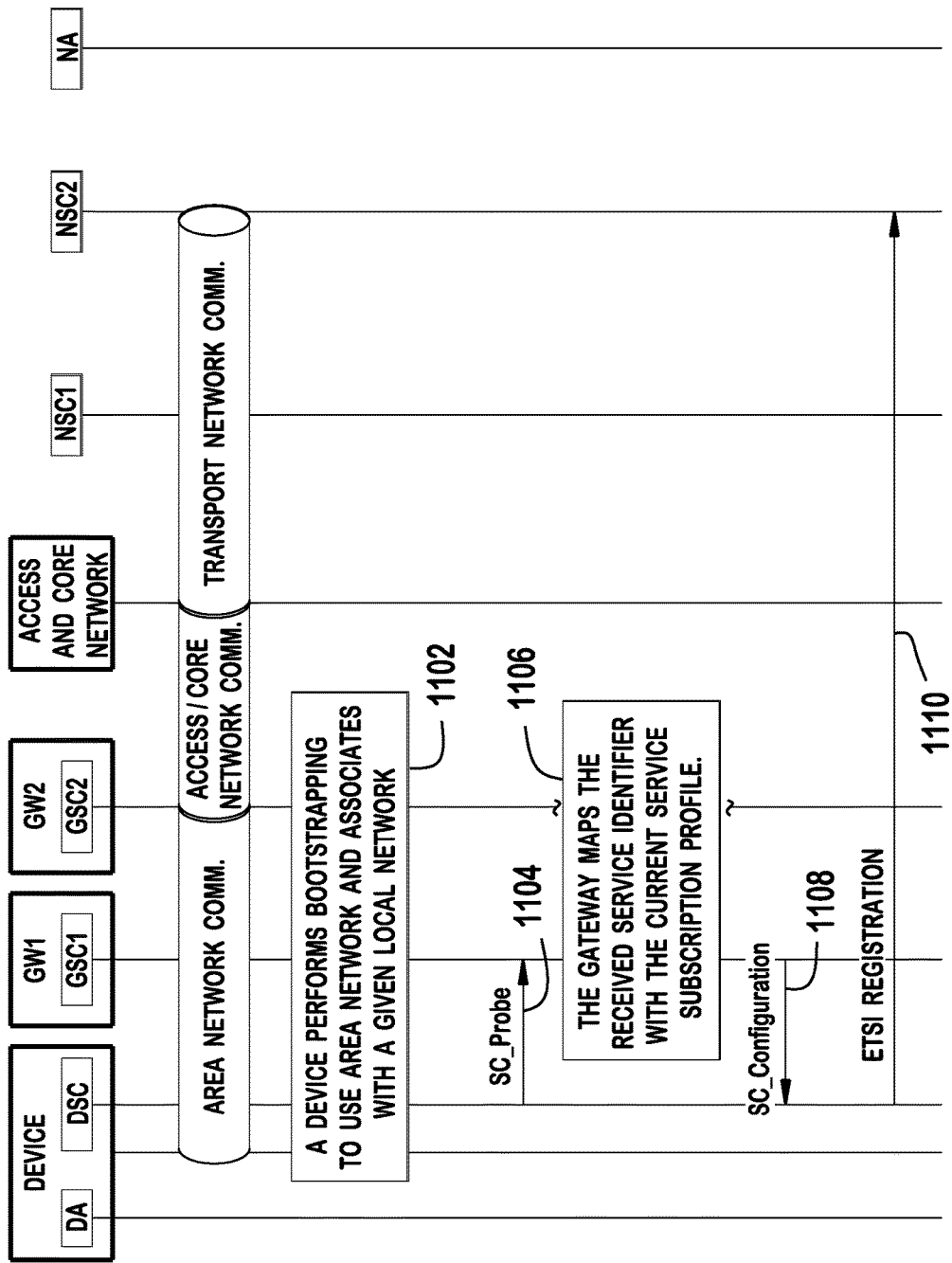
FIG. 11 is an example flow diagram of a procedure for the service capability discovery in a local network.

FIG. 11 is an example flow diagram of a procedure for the service capability discovery in a local network. A device performs bootstrapping to use the area network and associate with the local network (1102). The device may send a message, (hereafter referred to as "SC_Probe message" as an example), including its M2M service identifier supported, (e.g., "I am a thermostat"), to the M2M gateway with which it has already associated, (i.e., it has established a communication link) (1104). The device may use the IP address of the gateway (known after associating with the gateway) and may write the SC_Probe message to a default resource in the gateway. The message may list the M2M service identifiers supported by the device. These M2M service identifiers may have been stored in the hardware or software, for example at manufacturing time. Table 1 shows an example M2M service identifier.

The M2M gateway to which the device has associated may receive the SC_Probe message and map the received M2M service identifier with the current subscription profiles (1106). For example, if the M2M gateway has subscribed to a smart grid service capability layer enabling the monitoring and control of electricity consumption, the associated subscription may accept any devices with the primary M2M service identifier=Electricity Utility. The subscription may define specific secondary M2M service identifiers that are supported, (e.g., electricity meters, current control, thermostat, etc.). The same gateway may subscribe to multiple service capability layers. Once the M2M gateway has identified under which subscription the device may operate based on the service identifiers contained in the SC_Probe, the M2M gateway may send a message, (hereafter referred to as "SC_Configuration message" as an example) (1108). The SC_Configuration message may indicate to the device which entity or entities that the device may be talking to. As part of the plug-n-play configuration, the SC_Configuration message may be followed by application software update from the M2M gateway to support the subscribed application at the M2M device level. As such the software update may be triggered by the application running on the gateway or application in the network but subscribed at the gateway. The device out of the factory may have a stripped down software version with minimal client application. Once the device receives the SC_Configuration message, the device may perform registration with the correct SCL entity (1110).

Alternatively, the entity may broadcast the SC_Probe message in the local network, (e.g., using a broadcast IP address and a default resource). Any device in the local network that has subscribed to a service capability may respond to the entity with the SC_Configuration message. The entity collects and may combine the responses from the local network nodes that have responded, and perform some processing on these to prevent duplication or inconsistencies.

Alternatively, an entity, (e.g., M2M gateway), may send out periodically a broadcast message, (hereafter referred to as an SC_Advertisement message, as an example), in the local network. The SC_Advertisement message advertises a list of M2M service identifiers supported by the entity. The SC_Advertisement message may be sent to a broadcast IP address using a known default resource. A device receiving the SC_Advertisement message may compare its M2M service identifier with the ones contained in the SC_Advertisement message and respond with an SC_Probe message if one of its M2M service identifiers matches the advertised service identifiers. Alternatively, the entity may include the entire SCL address list in the SC_Advertisement message. Upon receiving this broadcast message, a device may cross-reference its M2M service identifier with that included in the broadcast list to determine appropriate SCLs.

With this embodiment, multiple groups of M2M devices may be handled by different subscription and M2M service operators without doing any configuration at the device level. For example, the M2M gateway may have subscribed to two service capability layers, one providing service to an electricity utility and another providing service to a surveillance security system. M2M devices that need access to one of these service capability layers may exhibit different M2M service identifiers, which would enable the M2M gateway to configure them differently, for example, assigning a different list of discovered SCs, different registration entities, different application software updates, or the like.

The M2M service identifiers may be stored in the hardware or software, for example, at manufacturing time. The M2M service identifier may change dynamically in time, since the same device may be used for different applications over its lifetime. For example, a device may be used as an e-health device at one time, and then be used as a consumer electronic device at another time.

The M2M service identifier may be any identifier that can be used to define a class or type of application or device. It is used to represent any identifier that may be used by the SCL to provide a tailored response. For example, the M2M service identifier may be an application class, (e.g., temperature sensor, motion detector, pressure gauge, etc.), a service class, (e.g., high priority, loss tolerant, etc.), a use-case class, (e.g., heating device, security device, etc.), or any combination.

Table 2 shows example contents of the SC_Probe, SC_Configuration, and SC_Advertisement messages.

TABLE 2

| Messages | Contents | Comments |
|---|---|---|
| SC_Probe | Entity identity | Address of Entity |
| | Destination identity | Address of recipient. Gateway IP address/default_resource - if Entity knows that recipient is the gateway Broadcast IP address/default_resource - if Entity needs to broadcast the probe in the local network |
| | Type of entity | Provides an indication if the entity sending the probe message is an M2M device (with or without service capabilities), a gateway, or a core network. |
| | List of Primary M2M Service Identifiers | Codes for the list of Service Identifiers For each primary M2M service identifier, Entity may provide a list of Secondary M2M Service Identifiers |
| | Desired Service Capability | Entity may declare the type of service capability it is looking for (e.g., ETSI registration, data storage, etc.) |

TABLE 2-continued

| Messages | Contents | Comments |
| --- | --- | --- |
| SC_Configuration | Entity identity | Address of Entity IP address + some default resource location (e.g., Entity_discovery) |
| | Address list of Service Capability Layers | Service capability Layers may be attached to a Primary M2M Service Identifier - Secondary M2M Service Identifiers |
| SC_Advertisement | Entity identity | Address of Entity |
| | Type of entity | Provides an indication if the devices sending the probe message is an M2M device (with or without service capabilities), a gateway, or a core network. |
| | List of Primary M2M Service Identifiers | Codes for the list of Service Identifiers For each primary M2M service identifier, Entity may provide a list of Secondary M2M Service Identifiers |
| | Address list of Service Capability Layers | Service capability Layers may be attached to a Primary M2M Service Identifier - Secondary M2M Service Identifiers |

The local network may carry the SCL address list as part of a lower layer message. For instance, in a wireless PAN, the information may be carried in control messages broadcast by the WPAN coordinator, (e.g., in the broadcast beacons). The SCL may use a standardized interface to the lower layers to enable the insertion and extraction of the SCL address list and to configure the lower layer, (e.g., with the frequency of transmission of the SCL address list).

In accordance with another embodiment, an entity may rely on the access network and a similar plug-n-play approach to assist in the service capability discovery. This may be integrated with the access/core network registration process or achieved through a new request message, (e.g., non-access stratum (NAS) message). For example, a gateway GPRS support node (GGSN) for global system for mobile communications (GSM) and universal terrestrial radio access network (UTRAN) and a packet gateway (P-GW) for evolved UTRAN (E-UTRAN) may be configured with the SCL address list and mapping to primary M2M service identifiers and secondary M2M service identifies. When an entity performs its access and core network registration and subsequent packet data protocol (PDP) context activation, the entity may include its M2M service identifier as part of the exchanged messages. In addition to activating a PDP context and assigning an IP address to the entity, the core network may provide the SCL address list. This information may be sent to the entity in the registration confirmation or PDP context activation message.

Alternatively, the entity may send a new NAS message to the core network, and the core network may respond with the SCL address list.

Alternatively, the access network may carry the SCL address list as part of a lower layer message. For instance in a cellular network, the information may be carried in control messages broadcast by the access point or base station, (e.g., in broadcast frames, synchronization frames, system information frames, or the like). The SCL may use a standardized interface to the lower layers to enable the insertion and extraction of the SCL address list and to configure the lower layer, (for example with the frequency of transmission of the SCL address list).

For cases where the entity is mobile or channel conditions are changing, the entity may refresh the SC database. The refresh may be periodic or triggered by some event. For example, if the entity physically moves and associates to a new gateway, and therefore its point of attachment to the network and application domain is changed, the entity may rely on the new gateway for some service capabilities. The lower layers of the entity may signal to the SCL of the new gateway. The SCL may then initiate a SC discovery procedure.

Once the SCLs have discovered each other, they may need to perform a service capability exchange and interaction in order to discover the service capability functionalities supported by the peer SCL and to configure the sharing of this functionality between the two SCLs. This interaction may be between different M2M cores, (i.e., network service capabilities (NSCs)), between gateways and their associated M2M core, between different gateways, between M2M devices and their associated M2M core or gateways, or between different M2M devices.

Service capability functionalities may be generic to any M2M element, (e.g., device, gateway, core networks), so they may be broadcast to any element that may receive it. This may be used for initial discovery. Alternatively, the service capability functionalities may be generic to a group of M2M elements so it may be multicast to the group. For example, a gateway supports data storage and retention for a group of M2M devices, and for another group of M2M devices, their data is stored at a higher tier gateway or M2M core. Alternatively, the service capability functionalities may be specific to an M2M element so it may be unicast to the specific M2M element.

Basic operations for SC exchange may be by query or by advertisement. In the query approach, the SCL in one element (called SCL1) may send a capability request message to another SCL (called SCL2). This message queries the service capabilities that SCL2 supports. Other capabilities beyond SC functionalities may be exchanged. After receiving the request, SCL2 sends a capability response message including the functionalities SCL2 supports. This initial SC configuration may be a standalone procedure, or the initial part of the SC registration, that is explained below.

In the advertisement approach, an SCL sends capability indication to one or more other SCL(s) to indicate the SC functionalities it supports. The other SCLs may or may not acknowledge the capabilities.

Figure 12:
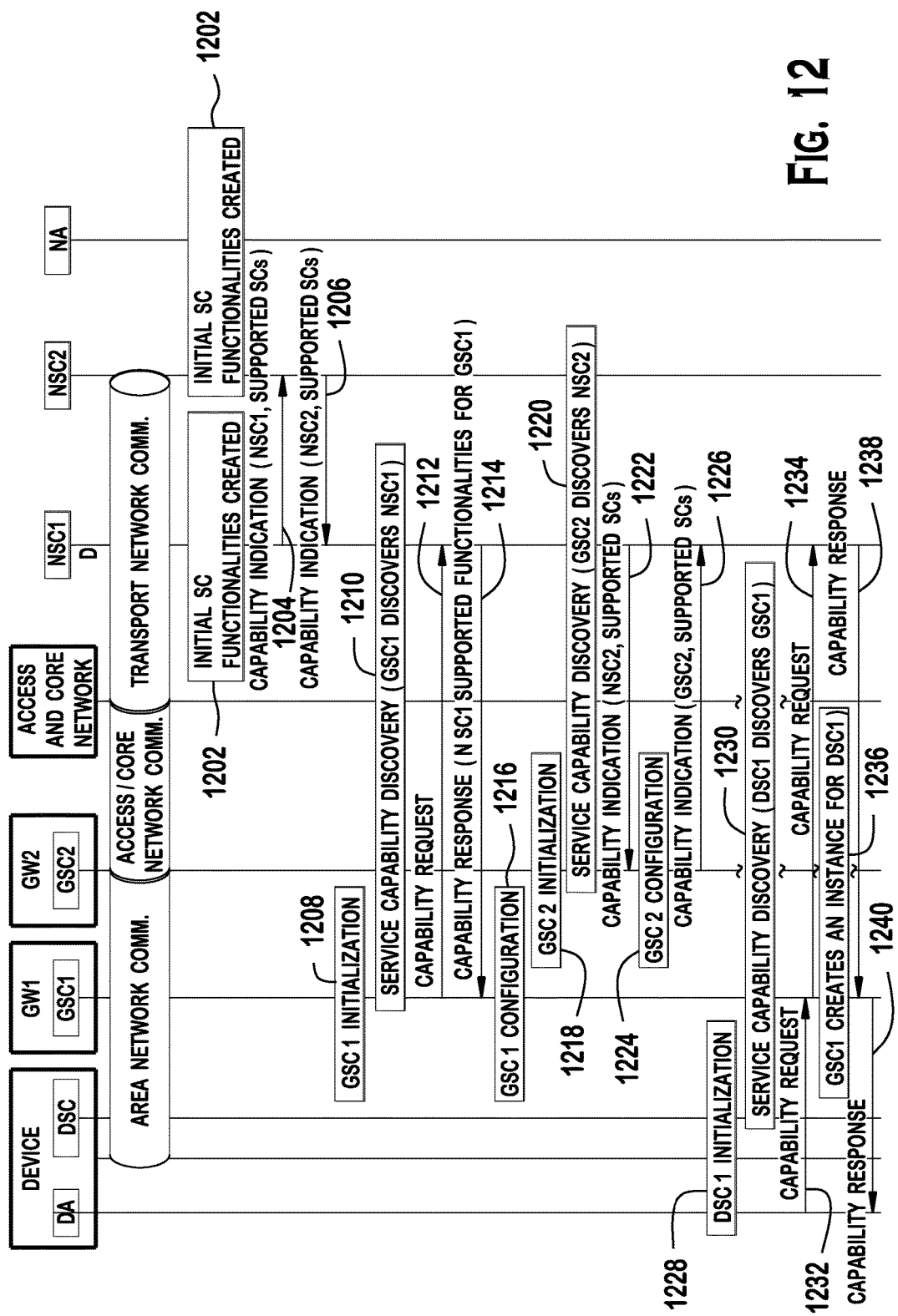
FIG. 12 is an example flow diagram of capability exchange between entities in a system including a device, two gateways, and two network operators.

FIG. 12 is an example flow diagram of capability exchange between entities in a system including a device, two gateways (GW1, GW2), and two network operators (NSC1, NSC2). The initial service capability functionalities are created at NSC1 and NSC2 (1202). NSC1 and NSC2 exchange capability indication including supported service capabilities (1204, 1206). GSC1 is initialized (1208). GSC1 performs service capability discovery (1210). In this example, GSC1 discovers NSC1 and sends a capability request to NSC1 (1212). NSC1 responds with a capability response (1214). GSC1 performs configuration based on the capability response (1216). GSC2 is initialized (1218). GSC2 performs service capability discovery (1220). In this example, GSC2 discovers NSC2 and receives a capability indication from NSC2 (1222). GSC2 performs configuration based on the capability indication (1224). GSC2 also sends capability indication to NSC2 (1226). DSC1 is initialized (1228). DSC1 performs service capability discovery (1230). In this example, DSC1 discovers GSC1 and sends a capability request to GSC1 (1232). Depending on the split of service capabilities, GSC1 may check with NSC1 for the split of service capabilities. Therefore, GSC1 may send a capability request to NSC1 and receive a capability response (1234, 1238). GSC1 creates an instance for DSC1 (1236). GSC1 sends a capability response (1240).

The capability request, response, and indication message exchanges are based on the assumption that the SCLs can access each other using the underlying area, access, core, and/or transport networks. These messages are not limited to SC functionalities, but may be used for general SC functionality discovery, negotiation, and configuration purposes. Table 3 shows an example information elements (IEs) of the capability request, response, and indication messages.

TABLE 3

| Messages | Contents | Comments |
|---|---|---|
| Capability Request | Source SCL | SCL which initiates the query |
| | Destination SCL | SCL which receives the query |
| | List of SCLs to be queried | The source SCL may ask supported functionalities of other SCLs, for example, a device SCL queries core SCL, and also asks for information regarding multiple gateway SCLs |
| | Supported SC functionalities at the source SCL | The source SCL may provide its own supported SC functionalities in the query to the destination |
| | Requested SC functionalities | A list of SC functionalities that the source SCL asks the destination SCL to provide |
| | Type of Element (Device, Gateway, Core, etc.) | The type of the element (the node) that initiates the request |
| | List of Primary M2M Service Identifiers | Codes for the list of Service Identifiers For each primary M2M service identifier, Entity may provide a list of Secondary M2M Service Identifiers. |
| Capability Response | Source and Destination SCL | |
| | List of SCs supported for the source SCL | The destination SCL may agree to support all requested SCs, or a partial or different set of SC functionalities. |
| | Type of Element (Device, Gateway, Core, etc.) | The type of the element (the node) that initiates the response |
| | List of Primary M2M Service Identifiers | Codes for the list of Service Identifiers For each primary M2M service identifier, there may be a list of Secondary M2M Service Identifiers |
| Capability Indication | Source SCL | The SCL which informs the destination SCL about the SC functionalities it supports |
| | Destination SCL SC functionality supported | The SCL that receives the indication SC functionalities that the source SCL supports. The source SCL may indicate generally the SC functionalities it supports; the source SCL may also indicate the SC functionalities it supports for a specific destination SCL |
| | Type of Element (Device, Gateway, Core, etc.) | The type of the element (the node) that initiates the indication |
| | List of Primary M2M Service Identifiers | Codes for the list of Service Identifiers For each primary M2M service identifier, there may be a list of Secondary M2M Service Identifiers |

The service capabilities may be re-configured. The service capability re-configuration may be due to mobility, (e.g., an M2M device or gateway has moved), change of SC capability, (e.g., a gateway runs out of storage space), change of service capability distribution by the M2M service provider for the gateways and/or devices belong to the core, periodic or regular trigger, registration to a new SCL, (e.g., a M2M device may discover a new SCL and want to use some of its service capability functions), or the like. The reconfiguration may be network initiated, gateway initiated, or device initiated. The messages defined in Table 3 may be used for re-configuration as well.

An SCL may perform a hierarchy discovery to determine the most efficient sharing of service capabilities for a source SCL that is trying to register. For instance, a device may be located behind many levels of gateways, each capable of providing service capabilities. When determining how to assign the service capabilities to the source SCL, the registration SCL needs to be aware of this hierarchy as the service capability functionality that each of the intermediate gateways may provide. This is determined by a hierarchy discovery procedure.

In accordance with one embodiment, if the source SCL has already performed an SC discovery procedure and maintains an SC database, the source SCL may include this information in its registration message. Alternatively, the registration SCL may request that the source initiate an SC discovery procedure to determine gateway connectivity.

In accordance with another embodiment, the registration SCL may trigger tracing at the source SCL. The source SCL may send a special message to the registration SCL, which is intercepted by the intermediate SCLs along the path to the registration SCL. Each of the intermediate SCLs appends an identity and a list of supported service capabilities in the special message. For example, the registration SCL may send a trace command to the source SCL, and the source SCL echoes this message back to the registration SCL. The source SCL may broadcast the trace message within its area network. Compatible devices and gateways that receive this message and is willing to offer service capabilities may intercept this message and append their identity and a list of service capability functions they want to offer, and forward this message higher or deeper in the hierarchy, (e.g., by transmitting another broadcast message). The message will eventually propagate to an edge gateway (gateway that provides connectivity to the access and core network). The edge gateway may append its own identity and service capability functions to the trace message. The edge gateway may then decide to forward the message directly to the registration SCL (through the access and core network). Upon receiving the trace message, the registration SCL has a complete list of nodes that the source SCL may talk to, as well as the service capability functions that these nodes are willing to offer. Table 4 shows an example IEs of the trace message.

TABLE 4

| Messages | Contents | Comments |
|---|---|---|
| traceSC | Recipient SCL | The intended recipient of the message 1) Initial transmission from Registration SCL would have Recipient SCL = Source SCL 2) Transmissions from within area network would have Recipient SCL = Broadcast address 3) Transmission from edge gateway would have Recipient SCL = Registration SCL |

TABLE 4-continued

| Messages | Contents | Comments |
|---|---|---|
| | Registration SCL | SCL which initiates the query |
| | Source SCL | SCL which receives the query |
| | List of SCL identities and offered service capabilities | Every SCL that intercepts this message will append its identity and offered service capabilities |
| | TransactionID | Identifier for the message, allows to avoid duplicate messages at registration SCL |

Embodiments for SCL registration are disclosed hereafter. Registration is a procedure by which a registration SCL authenticates and authorizes a source SCL or an application to use service capabilities within the registration SCL. A registration SCL refers to an SCL that hosts the registration context for a source SCL or for an application that has performed a registration procedure. A source SCL is an SCL that initiates a registration procedure. The entity hosting the source SCL can be a device or gateway service capability layer. Registration attributes refer to characteristics of entities, (i.e., devices, gateways, etc.), that are allowed to register. The characteristics may relate to physical characteristics (available power, available capacity), identification, service class, etc. These attributes form part of the registration context associated with the SCL of the entity.

When an SCL knows the identity of the SCL capable of handling registration, it performs a registration to that entity. The registration may be preceded by a pre-registration phase to determine the SCL to register among the discovered SCLs that support the registration function. The registration SCL may know the hierarchical layout of service capabilities it may use.

Figure 13:
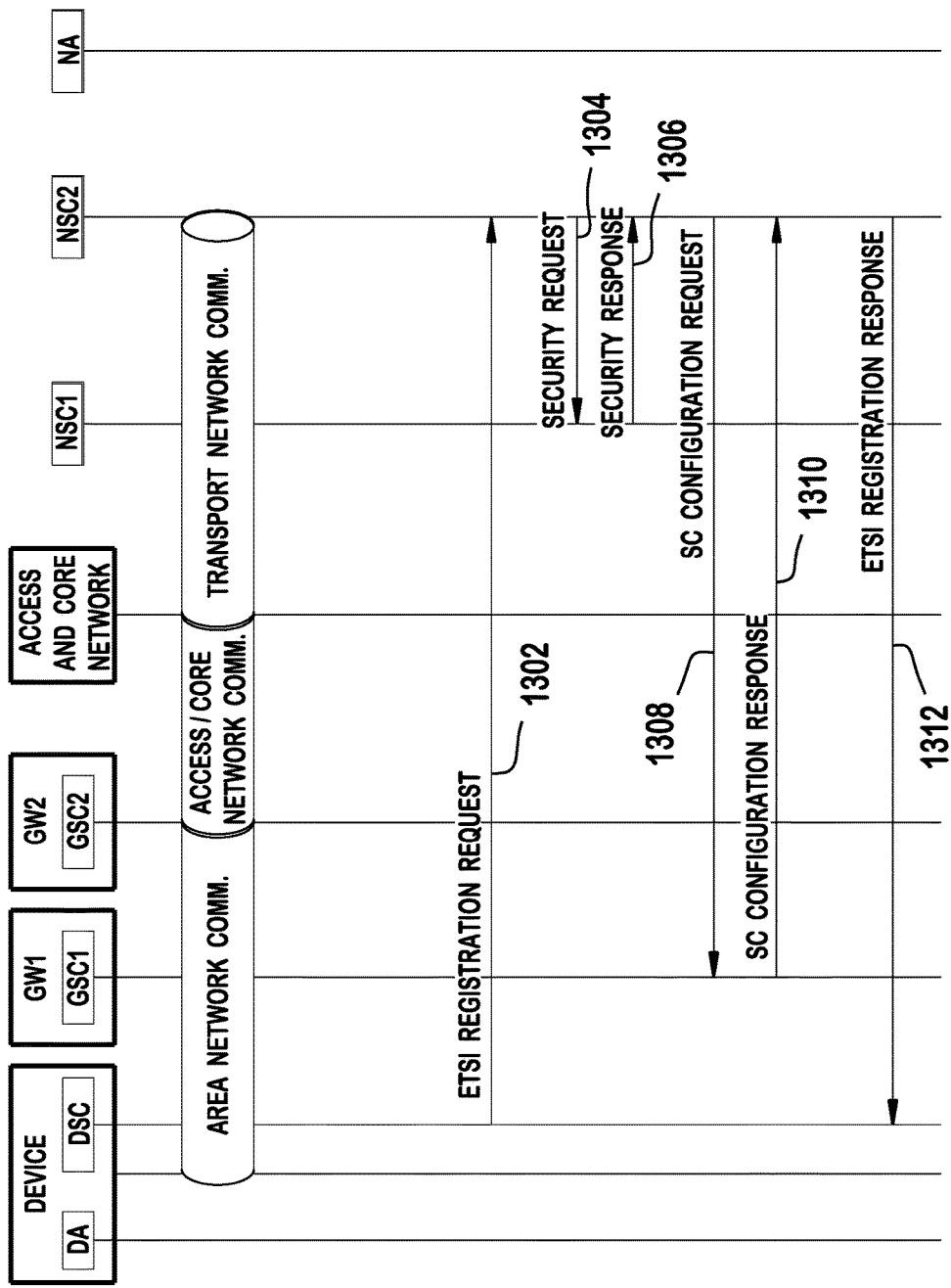
FIG. 13 is an example flow for registration.

FIG. 13 is an example flow for registration. As preconditions, GSC1, GSC2, NSC1, and NSC2 have discovered themselves and negotiated a sharing of service capabilities, NSC2 has delegated NSC1 to handle security service capability on its behalf, NA has already registered with NSC2 which will handle registration for the application, and the device has bootstrapped to the area network, has connectivity to this network, and has discovered its registration SCL (NSC2 in this example).

DSC sends a registration request to its registration SC, (i.e., NSC2 in this example) (1302). NSC2 sends a security request to NSC1 to use security service capability in NSC1 (1304). NSC1 sends a security response to NSC2 (1306). Since NSC2 delegates RAR capability to GSC1, NSC2 configures this service capability and passes registration context of DSC to GSC1 by sending SC configuration request (1308). GSC1 responds with an SC configuration response (1310). NSC2 informs DSC to use GSC1 for RAR functionality by sending registration response (1312).

An SCL may register with multiple SCLs. For example, a device may be connected to multiple local gateways and may use different service capability functions in each of the gateways, (e.g., one for caching and one for security and addressability). A device may be a roaming device so its SCL may be registered to both home and visiting cores.

One to multiple SCL registration may happen at initial SCL registration, (i.e., an SCL registers with multiple SCLs), or it may occur incrementally, (i.e., an SCL initially registers with one SCL, and registers to another SCLs later). A source SCL may send multiple registration requests to multiple target SCLs. The target SCLs create the necessary resources for the source SCL. Alternatively, the target SCL may request the source SCL to register with another SCL.

An SCL may appoint an "anchor" SCL as its registration SCL, and thus other SCLs may be deemed as "assisting" SCLs. SCL registration may be independent and transparent of application registration.

An application registers to communicate with SCLs and/or other applications. An application may register with one or multiple SCLs or another application(s). Application related parameters, (e.g., application type, storage space, cache requirement, etc.), and service capabilities required by the application may be included in the application registration request.

The application and SCL may exchange what service capability functions that the SCL may provide for the application. Not all service capability functions may be visible and available for all applications. The application may configure the service capability functions. For instance, for user-plane storage, the RADAR functionality may be configured for synchronous communication, asynchronous communication, etc. The application registration request may include an M2M service identifier (or similar identifier) to allow the registration SCL to delegate service capability functions to various SCLs on a per application basis, (e.g., after an initial SC configuration or reconfiguration).

When a source, (e.g., a requestor application), sends an application registration request to the target, (e.g., a target SCL), an application registration resource may be created, including the information included in the application registration request. The application may have a local copy of the service capabilities that it has registered and SC functionalities it can receive from the SCL. A registered application may then use the service capability functionalities of the SCL that it has registered. The created resource provides an interface by which the application is able to use the SCL.

In particular for a network application, the configuration of the registration SCL may include a whitelist of entities that are allowed to register to the registration SCL, a blacklist of entities that may be denied registration, (e.g., for cases that the application is normally open to entities except selected ones, such as those that are marked as misbehaving), an indication whether the registration SCL is allowed to perform service capability delegation. For example, the application may request that user-plane information storage be handled at the registration SCL, even though an device application may be behind a gateway capable of RADAR functionality.

During a device application registration to a gateway SCL (referred to as an SC instantiation for application), there may already be an agreement about what service capability functionalities the GSC may provide for the application. This agreement may have been pre-determined based on an M2M service identifier or similar identifier, (e.g., application class). For this application, the gateway may delegate the service capability functionalities to the NSC according to the agreement for the specific identifier.

Figure 14:
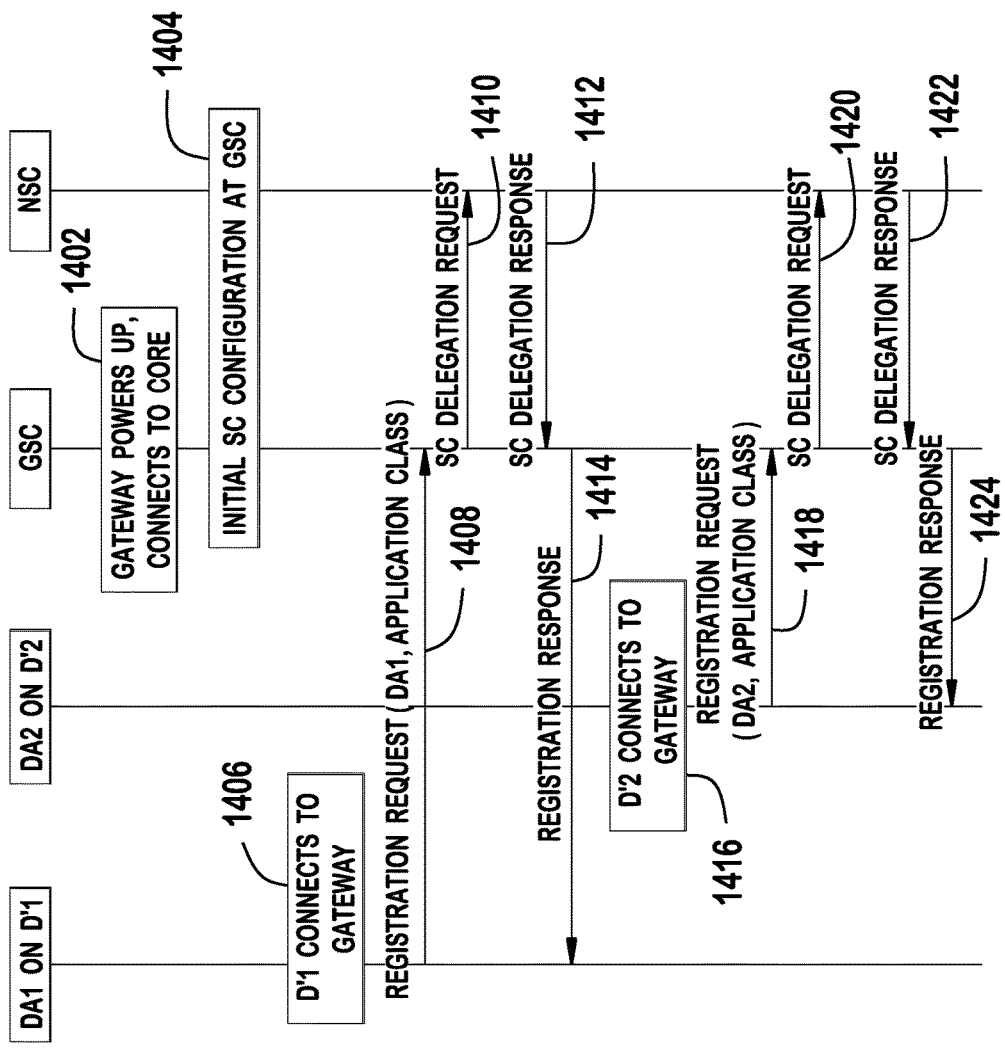
FIG. 14 is an example flow of service capability delegation based on application class in accordance with one embodiment.

FIG. 14 is an example flow of SC delegation based on application class in accordance with one embodiment. In this example, two devices are connected to the gateway. The network service capability has been created. A gateway powers up and connects to the core network (1402). The gateway performs initial SC configuration (1404). When the gateway registers, a service capability exchange between the gateway, (i.e., GSC), and the M2M service provider core network, (i.e., NSC), is performed. The application class identifier may be one factor in deciding what service capability functionalities the gateway may provide for the application. For each application class identifier, the NSC may decide how to split or share the service capabilities and inform the gateway of the capabilities that have been delegated. For example, for a smart meter data management application class, the gateway may provide the RAR storage functions to the application. For a security system application class, the core network may provide RAR storage functions. For both applications, the core network may provide HDR functions. The application class may be used to decide what SC functions to support for different applications at the gateway.

Device 1 connects to the gateway (1406), and sends a registration request along with the application class (1408). When the device initiates an application registration to the gateway (GSC), the gateway, based on the application class included in the registration procedure, configures the service capabilities for that specific application. This also includes informing the SCL in the network (NSC). The gateway sends an SC delegation request to NSC, and the NSC sends an SC delegation response (1410, 1412). The gateway then sends a registration response to device 1 (1414).

Device 2 connects to the gateway (1416), and sends a registration request along with the application class (1418). Different SC split may be applied for different devices due to different application class. The gateway sends an SC delegation request to NSC, and the NSC sends an SC delegation response (1420, 1422). The gateway then sends a registration response to device 2 (1424).

An application may register to multiple SCLs. An application may request different SC functionalities from the SCLs it registers with. Different SCLs may exchange information of the application (provided that it does not cause any security issues). Table 5 shows examples cases of one-to-multiple registration for an application, (i.e., requestor and targets for application registration to multiple SCLs).

"D device" is an ETSI M2M device that may directly communicate to an ETSI M2M core network or to an ETSI M2M gateway. "D' device" is an ETSI M2M device that does not implement ETSI M2M service capabilities, but interacts indirectly with the M2M core via the use of service capabilities in the M2M gateway. "mIa" is a reference point that offers generic and extendable mechanisms for application interactions with the M2M core. "dIa" is a reference point that offers generic and extendable mechanisms for application interactions with the service capabilities in the M2M device. "mId" is a reference point that offers generic and extendable mechanisms for M2M device and M2M gateway interactions with the NGC capability of the M2M core.

TABLE 5

| Requestor | Target | Direct/Indirect Interfaces |
| --- | --- | --- |
| DA on type D M2M Device | Local DSC and Multiple other DSCs | Direct (new device to device interface) Or indirect via dIa (through gateways) or mId (through core) |
| | Multiple GSCs | Direct dIa |
| | Multiple NSCs | Direct mIa |
| | A mixed of DSCs, GSCs and NSCs | Direct (dIa, mIa, or mId) |
| DA on type D' M2M Device | Multiple DSCs on other D M2M Devices | Direct (new device to device interface) Or indirect via dIa (through gateways) or mId (through core) |
| | Multiple GSCs | Direct dIa |
| | Multiple NSCs | Direct mIa |
| | A mixed of DSCs (on another D device), GSCs and NSCs | Direct (dIa, mIa, or mId) |

TABLE 5-continued

| Requestor | Target | Direct/Indirect Interfaces |
| --- | --- | --- |
| GA on M2M Gateway | Multiple GSCs | Direct (new gateway to gateway interface); or via mId through core |
| | Multiple NSCs | Direct mId |
| | Multiple DSCs | Direct (new GA to DSC interface) or indirect via dIa |
| | a mixture of NSCs, GSCs, DSCs | |
| NA on M2M core | Multiple NSCs | Direct (mIa) |
| | Multiple GSCs | Indirect (mIa, mId) |
| | Multiple DSCs | Indirect (mIa, mId) |
| | A mixture of NSC, GSC and DSC | Indirect (mIa, mId) |

An application (source application) may choose to register with another application (target application). For example, a device application may register with a network application. The application may be completely transparent to M2M SCLs. The application may or may not maintain the registration information. For example, registration information may be saved in a storage that is local to the application. Alternatively, the transaction between the source and target applications may be temporary. If the target application is registered with an SCL, it may use the service capability functionalities, (e.g., storage), to handle applications that have registered directly to it. The target application may act like a proxy for the source application. This may be useful to deal with the devices that have no service capabilities of their own and are not behind a gateway or legacy devices.

An SCL may announce an application(s) registered to it. The announcement may be sent when the SCL wants to make an application visible to another SCL. It informs applications that are registered with, and have resources in, the SCL. Table 6 is an example IEs of the SC announcement message.

TABLE 6

| Messages | Contents | Comments |
| --- | --- | --- |
| SC Announcement | Recipient SCL | Intended recipient SCL of announcement message |
| | Source SCL | SCL which initiates the query |
| | resource identifier | Identifier of resource that is being announced (this may be an application) |

An SCL may request service capability registration transfer. This is used by a requesting SCL to inform a target SCL that it wants to use the services of the target SCL, and it has already registered with another SCL, (the source SLC). The service capability registration transfer request message may include the requesting SCL's last point of attachment in order to facilitate the eventual transfer.

The service capability registration transfer request may be used by the requesting SCL to request a target SCL (SCL2) to transfer a registration context from a third SCL registered with SCL2, or a registration context from an application that has registered with the third SCL. Once the requesting SCL requests the transfer, the target SCL may retrieve the information from the source SCL. Alternatively, the requesting SCL may directly request the source SCL to transfer the service capability registration transfer to the target SCL.

A source SCL may broadcast or multicast to the neighbor SCLs the registration context of SCLs and applications that have registered to the source SCL. The amount of information that is broadcast may be tailored to reduce the signaling load. For example, the source SCL may broadcast partial information about the registered applications. Interested SCLs may then request the complete registration context.

In order to decide with which SCLs the information may be shared, SCLs may have a pre-configured list of neighboring SCLs to share the information. For example, in a warehouse, the list may be a list of gateways in the warehouse. Alternatively, SCLs may discover which ones are the neighboring SCLs and determine by themselves with which other SCLs the information may be shared. Alternatively, a central entity may be connected to SCLs and the central entity may inform the SCLs how to share the information.

Example cases for service capability transfer and mobility support for the M2M devices with and without service capabilities are explained with reference to FIGS. 15-26.

Figure 15:
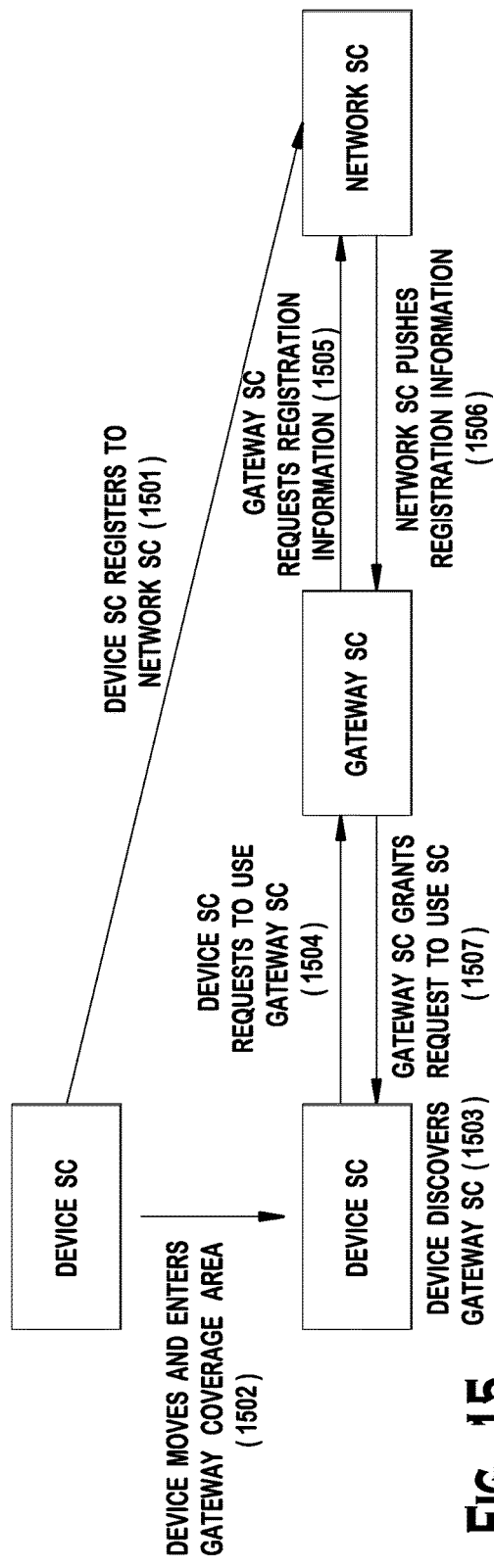
FIG. 15 is an example signaling flow for service capability transfer when an M2M device enters the gateway coverage and initiates the change.

FIG. 15 is an example signaling flow for service capability transfer when an M2M device enters the gateway coverage and initiates the change. The M2M device service capability is initially registered with the network service capability (1501). The M2M device moves and enters the gateway coverage area (1502). The M2M device discovers the gateway service capability (1503). The M2M device service capability request to use the gateway service capability (1504). The gateway service capability request registration information transfer from the network service capability (1505). The network service capability pushes the registration information to the gateway (1506). The gateway service capability then grants the request to use the service capability (1507).

Figure 16:
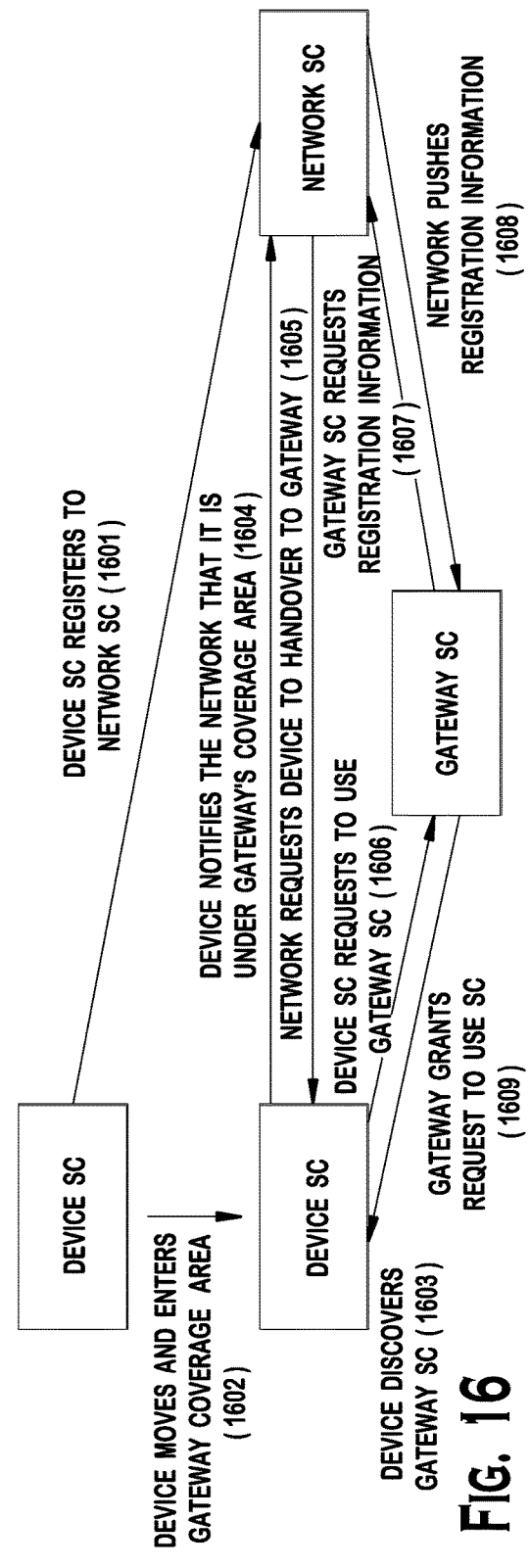
FIG. 16 is an example signaling flow for service capability transfer when an M2M device enters the gateway coverage and a network initiates the change.

FIG. 16 is an example signaling flow for service capability transfer when an M2M device enters the gateway coverage and a network initiates the change. The M2M device service capability is initially registered with the network service capability (1601). The M2M device moves and enters the gateway coverage area (1602). The M2M device discovers the gateway service capability (1603). The M2M device notifies the network that it is under the gateway's coverage area (1604). The network requests the M2M device to handover to the gateway (1605). The M2M device service capability request to use the gateway service capability (1606). The gateway service capability request registration information transfer from the network service capability (1607). The network service capability pushes the registration information to the gateway (1608). The gateway service capability then grants the request to use the service capability (1609).

Figure 17:
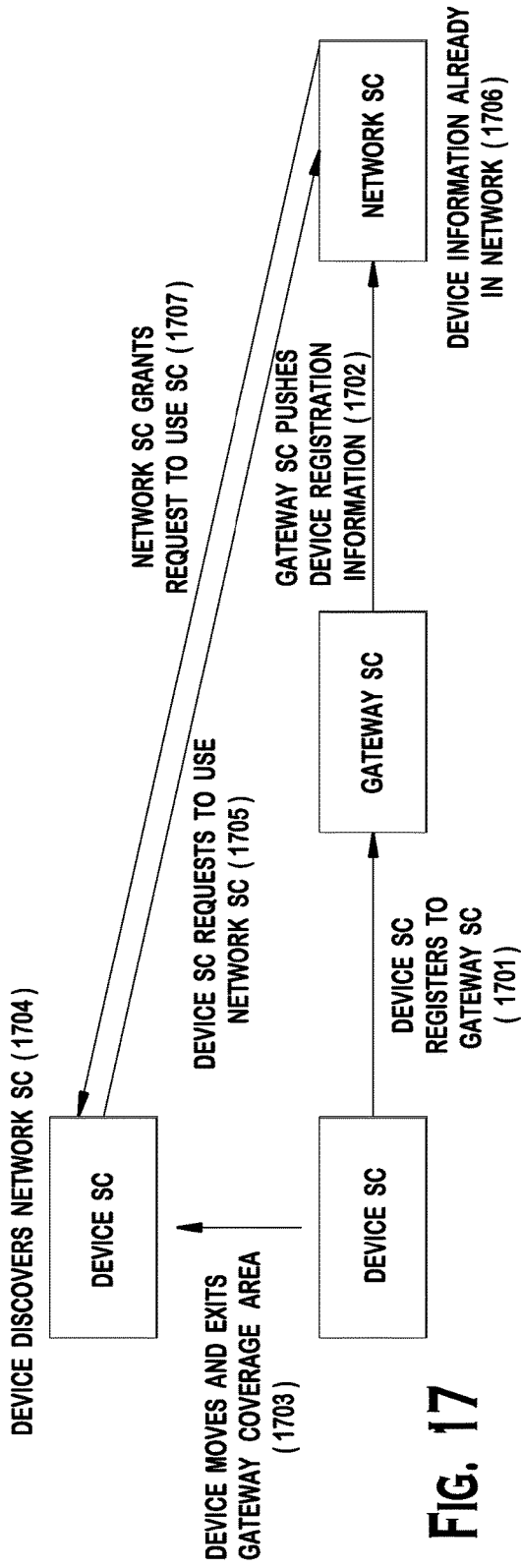
FIG. 17 is an example signaling flow for service capability transfer when an M2M device leaves the gateway coverage in case of full visibility.

FIG. 17 is an example signaling flow for service capability transfer when an M2M device leaves the gateway coverage in case of full visibility. The M2M device service capability registers with the gateway service capability (1701). The gateway service capability pushes the device registration information to the network service capability (1702). The M2M device moves and exits the gateway coverage area (1703). The M2M device discovers the network service capability (1704). The M2M device service capability request to use the network service capability (1705). Since the device information is already in the network, the network service capability grants the request to use the service capability (1706).

Figure 18:
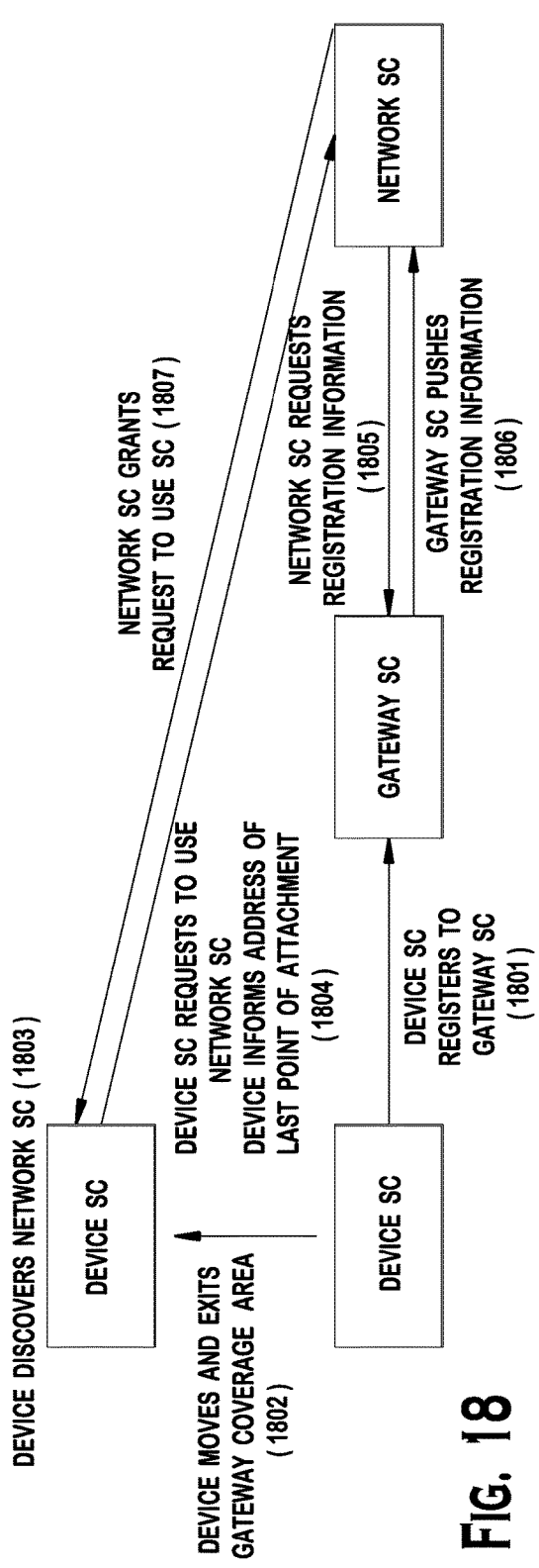
FIG. 18 is an example signaling flow for service capability transfer when an M2M device leaves the gateway coverage in case of no visibility.

FIG. 18 is an example signaling flow for service capability transfer when an M2M device leaves the gateway coverage in case of no visibility. The M2M device service capability registers with the gateway service capability (1801). The M2M device moves and exits the gateway coverage area (1802). The M2M device discovers the network service capability (1803). The M2M device service capability requests to use the network service capability (1804). The M2M device also informs the address of the last point of attachment. The network service capability requests the registration information of the device from the gateway service capability (1805). The gateway service capability pushes the registration information to the network service capability (1806). The network service capability grants the request to use the service capability (1807).

Figure 19:
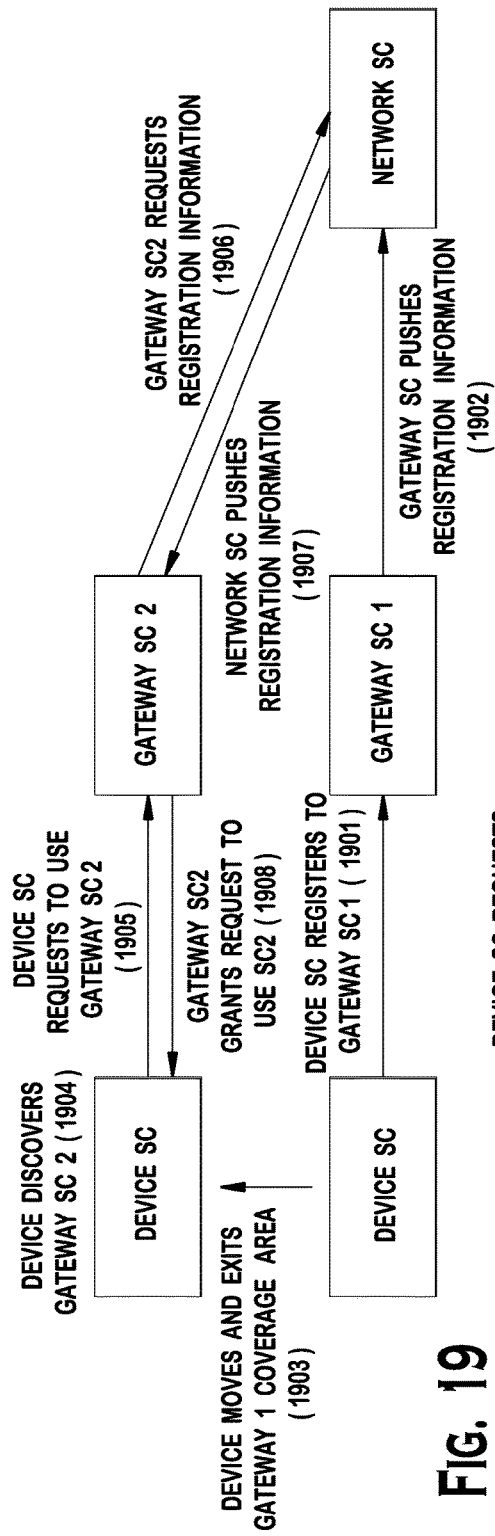
FIG. 19 is an example signaling flow for service capability transfer when an M2M device enters a new gateway coverage in case of full visibility.

FIG. 19 is an example signaling flow for service capability transfer when an M2M device enters a new gateway coverage in case of full visibility. The M2M device service capability registers with the gateway service capability 1 (1901). The gateway service capability 1 pushes the device registration information to the network service capability (1902). The M2M device moves and exits the gateway coverage area (1903). The M2M device discovers the gateway service capability 2 (1904). The M2M device service capability request to use the gateway service capability 2 (1905). The gateway service capability 2 request registration information of the M2M device from the network service capability (1906). The network service capability pushes the registration information to the gateway service capability 2 (1907). The gateway service capability 2 grants the request to use the service capability (1908).

Figure 20:
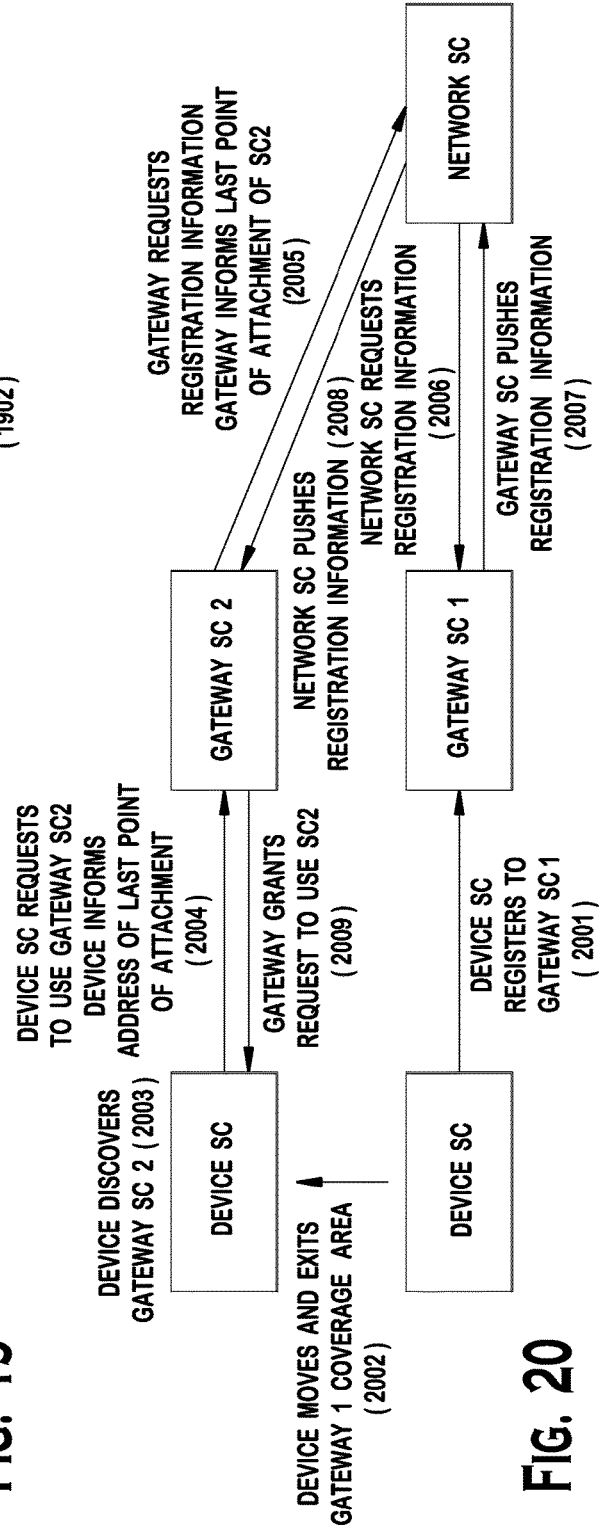
FIG. 20 is an example signaling flow for service capability transfer when an M2M device enters a new gateway coverage in case of no visibility.

FIG. 20 is an example signaling flow for service capability transfer when an M2M device enters a new gateway coverage in case of no visibility. The M2M device service capability registers with the gateway service capability 1 (2001). The M2M device moves and exits the gateway coverage area (2002). The M2M device discovers the gateway service capability 2 (2003). The M2M device service capability request to use the gateway service capability 2 (2004). The M2M device also informs the address of the last point of attachment. The gateway service capability 2 request registration information of the M2M device from the network service capability (2005). The gateway also informs the address of the last point of attachment of the M2M device. The network service capability request registration information of the M2M device from the gateway service capability 1 (2006). The gateway service capability 1 pushes the device registration information to the network service capability (2007). The network service capability pushes the registration information to the gateway service capability 2 (2008). The gateway service capability 2 grants the request to use the service capability (2009).

Figure 21:
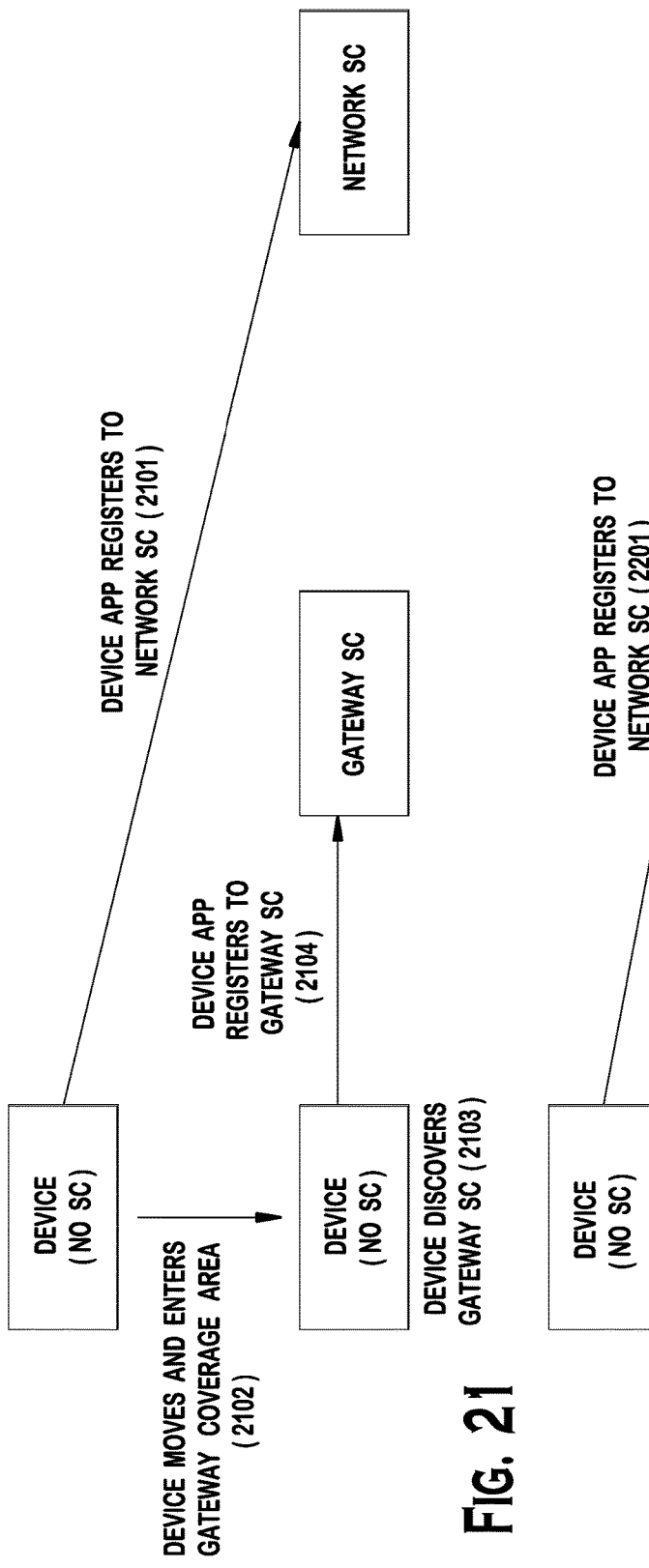
FIG. 21 is an example signaling flow for mobility support when an M2M device having no service capability enters the gateway coverage and initiates the change.

FIG. 21 is an example signaling flow for mobility support when an M2M device having no service capability enters the gateway coverage and initiates the change. The M2M device application is initially registered with the network service capability (2101). The M2M device moves and enters the gateway coverage area (2102). The M2M device discovers the gateway service capability (2103). The M2M device application registers with the gateway service capability (2104).

Figure 22:
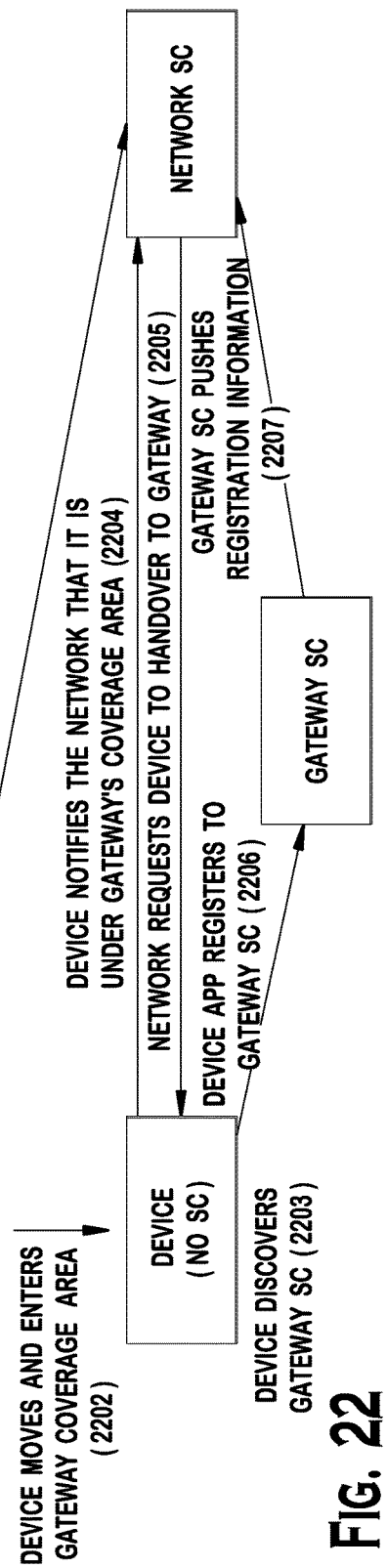
FIG. 22 is an example signaling flow for mobility support when an M2M device having no service capability enters the gateway coverage and a network initiates the change.

FIG. 22 is an example signaling flow for mobility support when an M2M device having no service capability enters the gateway coverage and a network initiates the change. The M2M device application is initially registered with the network service capability (2201). The M2M device moves and enters the gateway coverage area (2202). The M2M device discovers the gateway service capability (2203). The M2M device notifies the network that it is under the gateway's coverage area (2204). The network requests the M2M device to handover to the gateway (2205). The M2M device application registers with the gateway service capability (2206). The gateway service capability pushes registration information to the network service capability in case of full visibility (2207). Alternatively, the network may push the device application information to the gateway, and the device may request to the gateway to use the gateway's service capability, and since the information is already available at the gateway, the gateway may grant the request from the device.

FIG. 23 is an example signaling flow for service capability transfer when an M2M device having no service capability leaves the gateway coverage in case of full visibility. The M2M device application registers with the gateway service capability (2301). The gateway service capability announces the device applications to the network service capability (2302). The M2M device moves and exits the gateway coverage area (2303). The M2M device discovers the network service capability (2304). The M2M device application registers with the network service capability (2305). Alternatively, the gateway may push the device application information to the network, and the device may request to the network to use the network's service capability, and since the information is already available at the network, the network may grant the request from the device.

FIG. 24 is an example signaling flow for service capability transfer when an M2M device having no service capability leaves the gateway coverage in case of no visibility. The M2M device application registers with the gateway service capability (2401). The M2M device moves and exits the gateway coverage area (2402). The M2M device discovers the network service capability (2403). The M2M device application registers with the network service capability (2404).

FIG. 25 is an example signaling flow for service capability transfer when an M2M device having no service capability enters a new gateway coverage in case of full visibility. The M2M device application registers with the gateway service capability 1 (2501). The gateway service capability 1 announces the device application to the network (2502). The M2M device moves and exits the gateway 1 coverage area (2503). The M2M device discovers the gateway service capability 2 (2504). The M2M device application registers with the gateway service capability 2 (2505). The gateway service capability 2 announces the device application to the network (2506).

FIG. 26 is an example signaling flow for service capability transfer when an M2M device having no service capability enters a new gateway coverage in case of no visibility. The M2M device application registers with the gateway service capability 1 (2601). The M2M device moves and exits the gateway 1 coverage area (2602). The M2M device discovers the gateway service capability 2 (2603). The M2M device application registers with the gateway service capability 2 (2604).

Embodiments

1. A method for supporting M2M communications.

2. The method of embodiment 1 comprising an M2M entity performing a service capability discovery procedure to discover an M2M service capability entity that provides an M2M service capability.

3. The method of embodiment 2 comprising the M2M entity performing registration with at least one of discovered M2M service capability entity using an identity or address obtained during the service capability discovery procedure.

4. The method of embodiment 3 wherein the registration is performed with a pre-configured identity or address.

5. The method as in any one of embodiments 2-4, wherein the service capability discovery procedure comprises sending a request to a dispatcher server using a pre-configured identity or address.

6. The method of embodiment 5 wherein the service capability discovery procedure comprises receiving a list of M2M service capability entities from the dispatcher server with identities or addresses of the M2M service capability entities, wherein the registration is performed with an M2M service capability entity in the list.

7. The method as in any one of embodiments 2-6, wherein the service capability discovery procedure comprises sending a first message in an M2M gateway, the first message including an M2M service identifier supported by the M2M entity.

8. The method of embodiment 7 wherein the service capability discovery procedure comprises receiving, from the M2M gateway, a second message indicating an M2M service capability entity and an identity or address of the M2M service capability entity.

9. The method of embodiment 8, wherein the registration is performed with the M2M service capability entity indicated in the second message.

10. The method as in any one of embodiments 2-9, wherein the service capability discovery procedure comprises receiving an advertisement message from an M2M gateway, the advertisement message including a list of M2M service identifiers supported by the M2M gateway.

11. The method of embodiment 10 wherein the service capability discovery procedure comprises comparing an M2M service identifier supported by the M2M entity with the list of M2M service identifiers contained in the advertisement message.

12. The method of embodiment 11, wherein the first message is sent on a condition that there is a match between the M2M service identifier supported by the M2M entity and the list of M2M service identifiers.

13. The method as in any one of embodiments 2-12, wherein the service capability discovery procedure comprises sending a first message to a core network including a supported M2M service identifier by the M2M entity.

14. The method of embodiment 13 wherein the service capability discovery procedure comprises receiving a second message including a list of identities or addresses of M2M service capability entities.

15. The method of embodiment 14, wherein the registration is performed with an M2M service capability entity included in the second message.

16. The method as in any one of embodiments 2-15, further comprising performing a service capability exchange with the discovered M2M service capability entity.

17. The method as in any one of embodiments 2-16, further comprising performing a hierarchy discovery to determine a hierarchy of a network to which the M2M entity belongs.

18. The method of embodiment 17 wherein the M2M entity includes hierarchy information in a message sent for the registration.

19. The method as in any one of embodiments 17-18, further comprising sending a trace message to the M2M service capability entity to register, wherein identities of intermediate nodes are recorded in the trace message.

20. The method as in any one of embodiments 2-19, wherein the M2M entity is an M2M gateway.

21. The method of embodiment 20, wherein the M2M gateway includes at least one of functionalities related to discovery of service capability across a hierarchical architecture, configuration of service capability across a hierarchical architecture, GMDAE, RADAR, NCSS, HDR, SC, GMAE, MDGM, CB capability, MDGP, or location service.

22. A device for supporting M2M communications.

23. The device of embodiment 22 comprising a processor configured to perform a service capability discovery procedure to discover an M2M service capability entity that provides an M2M service capability.

24. The device of embodiment 23 wherein the processor is configured to perform registration with at least one of discovered M2M service capability entity using an identity or address obtained during the service capability discovery procedure.

25. The device of embodiment 24 wherein the processor is configured to perform the registration with a pre-configured identity or address.

26. The device as in any one of embodiments 24-25, wherein the processor is configured to send a request to a dispatcher server using a pre-configured identity or address, receive a list of M2M service capability entities from the dispatcher server with identities or addresses of the M2M service capability entities, and perform the registration with an M2M service capability entity in the list.

27. The device as in any one of embodiments 24-26, wherein the processor is configured to send a first message to an M2M gateway, the first message including an M2M service identifier supported by the M2M entity, receive, from the M2M gateway, a second message indicating an M2M service capability entity and an identity or address of the M2M service capability entity, and perform the registration with the M2M service capability entity indicated in the second message.

28. The device as in any one of embodiments 24-27, wherein the processor is configured to receive an advertisement message from an M2M gateway, the advertisement message including a list of M2M service identifiers supported by the M2M gateway, compare an M2M service identifier supported by the M2M entity with the list of M2M service identifiers contained in the advertisement message, and send the first message on a condition that there is a match between the M2M service identifier supported by the M2M entity and the list of M2M service identifiers.

29. The device as in any one of embodiments 24-28, wherein the processor is configured to send a first message to a core network including a supported M2M service identifier by the M2M entity, receive a second message including a list of identities or addresses of M2M service capability entities, and perform the registration with an M2M service capability entity included in the second message.

30. The device as in any one of embodiments 24-29, wherein the processor is configured to perform a service capability exchange with the discovered M2M service capability entity.

31. The device as in any one of embodiments 24-30, wherein the processor is configured to perform a hierarchy discovery to determine a hierarchy of a network to which the M2M entity belongs.

32. The device of embodiment 31 wherein the processor is configured to include hierarchy information in a message sent for the registration.

33. The device as in any one of embodiments 31-32, wherein the processor is configured to send a trace message to the M2M service capability entity to register, wherein identities of intermediate nodes are recorded in the trace message.

34. The device as in any one of embodiments 24-33, wherein the device is an M2M gateway.

35. The device of embodiment 34, wherein the device includes at least one of functionalities related to discovery of service capability across a hierarchical architecture, configuration of service capability across a hierarchical architecture, GMDAE, RADAR, NCSS, HDR, SC, GMAE, MDGM, CB capability, MDGP, or location service.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for supporting machine-to-machine (M2M) communications, the method comprising:
   registering, by an M2M gateway, with a M2M service capability entity to access an external M2M functionality that resides outside the M2M gateway and is provided by the M2M service capability entity;
   providing, by the M2M gateway, a common services layer to allow the external M2M functionality that resides outside the M2M gateway to be shared using an M2M service capability interface;
   routing a request, by the M2M gateway via the common services layer, from an M2M application to the M2M service capability entity to allow the M2M application to use the external M2M functionality that can be shared with another M2M application, wherein routing the request comprises accessing a resource belonging to the M2M service capability entity; and
   sending, by the M2M gateway, information about the M2M gateway to an M2M core network, wherein the information includes an identification of the M2M gateway.

2. A machine-to-machine (M2M) gateway, the M2M gateway comprising:
   a memory; and
   a processor configured to:
   register with a M2M service capability entity to access an external M2M functionality that resides outside the M2M gateway and is provided by the M2M service capability entity;
   provide a common services layer to allow the external M2M functionality that resides outside the M2M gateway to be shared using a M2M service capability interface;
   route a request, via the common services layer, from an M2M application to the M2M service capability entity to allow the M2M application to use the external M2M functionality that can be shared with another M2M application, wherein the processor is configured to access a resource belonging to the M2M service capability entity; and
   send information about the M2M gateway to an M2M core network, wherein the information includes an identification of the M2M gateway.

3. The method of claim 1, wherein the external M2M functionality comprises a management functionality.

4. The method of claim 1, wherein the external M2M functionality comprises a device management functionality.

5. The method of claim 1, wherein the external M2M functionality comprises a communication management functionality.

6. The method of claim 1, wherein the external M2M functionality comprises a data management and repository functionality.

7. The method of claim 1, wherein the external M2M functionality comprises a network selection functionality.

8. The method of claim 1, wherein the external M2M functionality comprises a service charging and accounting functionality.

9. The method of claim 1, further comprising providing a gateway management proxy for a device connected to an M2M network.

10. The method of claim 1, further comprising receiving an authorization to use the external M2M functionality.

11. The method of claim 1, wherein the information about the M2M gateway further comprises at least an available power level, an available capacity level, or a service class.

12. The M2M gateway of claim 2, wherein the external M2M functionality comprises a management functionality.

13. The M2M gateway of claim 2, wherein the external M2M functionality comprises a device management functionality.

14. The M2M gateway of claim 2, wherein the external M2M functionality comprises a communication management functionality.

15. The M2M gateway of claim 2, wherein the external M2M functionality comprises a data management and repository functionality.

16. The M2M gateway of claim 2, wherein the external M2M functionality comprises a network selection functionality.

17. The M2M gateway of claim 2, wherein the external M2M functionality comprises a service capability entities comprise service charging and accounting functionality.

18. The M2M gateway of claim 2, wherein the processor is further configured to provide a gateway management proxy for a device connected to an M2M network.

19. The M2M gateway of claim 2, wherein the processor is further configured to receive an authorization to use the external M2M functionality.

20. The M2M gateway of claim 2, wherein the information about the M2M gateway further comprises at least an available power level, an available capacity level, or a service class.

\* \* \* \* \*